(12) United States Patent
Kanamaru et al.

(10) Patent No.: US 6,647,547 B1
(45) Date of Patent: Nov. 11, 2003

(54) PROGRAM CONVERSION APPARATUS FOR ELIMINATING UNNECESSARY INDICATIONS OF DYNAMIC MEMORY ALLOCATION FROM A SOURCE PROGRAM AND GENERATING AN EXECUTABLE PROGRAM

(75) Inventors: Tomokazu Kanamaru, Moriguchi (JP); Nobuki Tominaga, Kyoto (JP); Shusuke Haruna, Itami (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/573,487

(22) Filed: May 16, 2000

(30) Foreign Application Priority Data

May 18, 1999 (JP) .......................... 11-137762

(51) Int. Cl.[7] ............................. G06F 9/45
(52) U.S. Cl. ..................... 717/151; 709/104
(58) Field of Search ................. 717/137, 140, 717/150–154, 160, 168; 712/241, 244; 714/25, 37–38; 709/104; 711/170–173

(56) References Cited

U.S. PATENT DOCUMENTS 5,963,740 A * 10/1999 Srivastava et al. .......... 717/130

6,247,105 B1 * 6/2001 Goldstein et al. .......... 711/170
6,327,704 B1 * 12/2001 Mattson et al. ............ 717/153
6,442,663 B1 * 8/2002 Sun et al. .................. 711/202

FOREIGN PATENT DOCUMENTS

| JP | 8272621 | 10/1996 |
| JP | 9330232 | 12/1997 |
| JP | 132406 | 5/2000 |

* cited by examiner

Primary Examiner—Kakali Chaki
Assistant Examiner—L J Shrader

(57) ABSTRACT

A program conversion apparatus that converts a source program to an executable program, the source program including a first descriptor indicating dynamic memory allocation. The program conversion apparatus includes a specifying unit and a generating unit. The specifying unit specifies in the source program a reference descriptor that is last to be executed from reference descriptors indicating references to memory allocated by the first descriptor. The generating unit generates an instruction for freeing the allocated memory at a position in the executable program immediately following an instruction that corresponds to the specified reference descriptor.

15 Claims, 18 Drawing Sheets

Fig. 14

(a) PRIOR TO LOCALIZING

```
void sample(int k)
{
        int *b ;
          ⋮
(1)     new int a = 200 ;     // ALLOCATE MEMORY
          ⋮
(2)     c = a + 1 ;           // USE CODE
          ⋮
(3)     b = &a ;              // USE CODE
          ⋮
(4)     putchar(*b) ;         // USE CODE
          ⋮
}
```

(b) AFTER LOCALIZING

```
void sample(int k)
{
(11)    int a = 200 ;         // ALLOCATE LOCAL VARIABLE
        int *b ;
          ⋮
(12)    c = a + 1 ;           // USE CODE
          ⋮
(13)    b = &a ;              // USE CODE
          ⋮
(14)    putchar(*b) ;         // USE CODE
          ⋮
}
```

Fig. 15

(a) PRIOR TO CONTINUOUS PROCESSING

```
void sample(int k)
{
        int *b ;
        ⋮
        for (i=0; i<200; i++)
        {
            ⋮
(1)         new int a ;                      // ALLOCATE MEMORY
(2)         a = (calc(i)+calc(i + 1))/2 ;    // USE CODE
(3)         b = &a ;                         // USE CODE
(4)         other_function(b) ;              // USE CODE
            ⋮
        }
        ⋮
}
```

(b) AFTER CONTINUOUS PROCESSING

```
void sample(int k)
{
        int *b ;
        ⋮
(11)    new int a = [200] ;
        for (i=0; i<200; i++)
        {
            ⋮
(12)        a[i] = (calc(i)+calc(i + 1))/2 ; // USE CODE
(13)        b = &a[i] ;                      // USE CODE
(14)        other_function(b) ;              // USE CODE
            ⋮
        }
        ⋮
}
```

Fig. 16

(a) PRIOR TO CONTINUOUS LOCALIZING

```
void sample(int k)
{
    int *b ;
        ⋮
    for (i=0; i<200; i++)
    {
            ⋮
(1)     new int a ;             // ALLOCATE MEMORY
(2)     a = (b+calc(i))/2 ;     // USE CODE
(3)     printvalue(a) ;         // USE CODE
(4)     b = &a ;                // USE CODE
    }
        ⋮
}
```

(b) AFTER CONTINUOUS LOCALIZING

```
void sample(int k)
{
(11)    int a[200] ;            // ALLOCATE MEMORY IN BULK
        int *b ;
            ⋮
        for (i=0; i<200; i++)
        {
                ⋮
(12)        a[i] = (b+calc(i))/2 ;   // USE CODE
(13)        printvalue(a[i]) ;       // USE CODE
(14)        b = &a[i] ;              // USE CODE
                ⋮
        }
            ⋮
}
```

Fig. 17

(a) PRIOR TO SHARE PROCESSING

```
void sample(int k)
{
        ⋮
        for (i=0; i<200; i++)
        {
            ⋮
(1)         new int a;                    // ALLOCATE MEMORY
            ⋮
(2)         a = (calc(i)+calc(i+1))/2;    // USE CODE
            ⋮
(3)         printvalue(a);                // USE CODE
            ⋮
        }
        ⋮
}
```

(b) AFTER SHARE PROCESSING

```
void sample(int k)
{
(11)    int a;                            // ALLOCATE JUST ONE LOCAL VARIABLE
        ⋮
        for (i=0; i<200; i++)
        {
            ⋮
(12)        a = (calc(i)+calc(i+1))/2;    // USE CODE
            ⋮
(13)        printvalue(a);                // USE CODE
            ⋮
        }
        ⋮
}
```

PROGRAM CONVERSION APPARATUS FOR ELIMINATING UNNECESSARY INDICATIONS OF DYNAMIC MEMORY ALLOCATION FROM A SOURCE PROGRAM AND GENERATING AN EXECUTABLE PROGRAM

This application is based on an application No. 11-137762 filed in Japan, the content of which is hereby incorporated by reference.

BACKGROUND OF THE INVENTION

1. Field of the Invention

The invention relates to a program conversion technique, and in particular to a technique that uses a compiler to assist in the management of dynamic memory allocation by the execution thread.

2. Related Art

Most conventional programming languages use several types of variables. These may be classified into global variables, which are allocated memory throughout execution of an entire program, local variables, which are allocated memory only when a local section of a program, such as inside a particular function, is executed, and dynamic variables, which are allocated memory dynamically using a code within a program. Examples of codes for allocating memory dynamically to variables are the library function malloc used in C programming language and the object generating operator new used in Java™.

Memory allocated to a local variable is certain to be freed once execution of a local program section, such as calling a function, has been completed, but it is more difficult to determine the point in the program at which a dynamic variable will no longer be required. The following is an explanation of the use of dynamic variables.

When dynamic variables are used by a computer, the size of an area used for dynamic memory allocation of variables (the heap area) is limited. This means that some kind of mechanism is required to free the part of the heap area allocated to variables that are no longer in use, thereby allowing it to be used by new variables.

The methods used to free the part of the heap area occupied by data (variables) that are no longer in use, can be roughly divided into two, depending on which type of programming language is used.

1. The programmer explicitly writes an instruction for freeing memory in the source program, in the same way as when memory is allocated. This method forms part of what is known as manual memory management.
2. A program execution thread determines whether data allocated memory in the heap area is still in use or not, and frees memory allocated to data that is no longer in use. This method forms part of what is known as automatic memory management.

FIG. 1 illustrates the generation of execution-format code in C, C++ and Java.

As shown in FIG. 1A, programming languages such as C and C++ use a manual memory management method ((1) above), in which a source program is converted into machine code by a compiler (linker) and the machine code is executed directly as execution format code. In C, memory is allocated by the library function malloc and freed by a library function free, while in C++ memory is allocated by an operator new and freed by an operator delete.

Programming languages such as Java, however, use automatic memory management ((2) above), as shown in FIG. 1B. Here, a source program is first converted into Java bytecode by the compiler (linker). Then an interpreter translates the Java bytecode into execution-format code and executes it. In Java, memory is allocated by the object generating operator new and freed by the interpreter.

The following is a more detailed explanation of the way that memory is freed in these memory management methods.

In manual memory management, memory is freed by an explicit program instruction, so that responsibility for freeing memory rests with the program, and the execution thread does not determine whether data in the heap area is in use or not.

However, in a program written in C++ or similar, a free instruction may be erroneously omitted from the program by the programmer, thereby preventing the recycling of memory which is no longer in use and should therefore be freed. As a result, the amount of available memory may be insufficient to execute the program, and the original program will have difficulty in specifying the cause of such lack of memory. Conversely, suppose that memory which is still being used by the program is freed by mistake (also known as a premature free). If the data that was allocated to this memory is required again by the program, the resulting program bug is extremely difficult to trace.

Having the program indicate appropriate times for freeing memory when using a manual memory management method such as (1) is on occasion an extremely difficult task. The resulting discrepancy between memory holding data that is no longer in use and memory that is actually freed by the program means that there is always a risk of generating the above-described inefficiencies.

In the automatic memory management method (2), however, only the allocation of memory is indicated in the program, and the freeing of memory is left wholly to the execution thread (through the automatic memory management of the interpreter). This avoids the risks posed by the manual memory management method (1), thereby allowing the proper use of data which has been dynamically allocated memory.

In a Java interpreter (execution thread) used in the automatic memory management method (2), dynamic memory management can be smoothly performed using garbage collection. Garbage collection consists of 'identification' processing for determining whether data stored in the heap area is in use (alive), or not in use (garbage), and 'recycling' processing for collecting into one all memory allocated to data which has been determined to be no longer in use.

Object-orientated languages have become a focus of attention in recent years for reasons such as their high degree of program re-use. Most object-orientated languages allocate memory in the heap area to objects, so that the execution capability of an application written in object-orientated language is frequently determined by the success rate of memory management performed by execution threads.

Both C++ and Java are object-orientated languages, but since Java uses automatic memory management, freeing dynamically-generated objects is left entirely to a garbage collector (the device performing garbage collection).

The following is one example of a program written in Java.

for (i=0;i<1000;i++){
      g.setcolor(new color(0,0,i))// set a color for object g
      g.line(0,1,999,i) } // draw a line under object g In this program, the operator new is used in a for loop to dynamically generate an object in a class color. However, a color class object is only used for a short period due to the fact that a different color is set on each loop repetition, so that the color class object is likely to become garbage immediately following the execution of g.setcolor(new color (0,0,i)) for each value of i.

An instruction set for a Java virtual machine (a bytecode execution thread including an interpreter) conforming to the specifications stipulated by Sun Microsystems Inc does not include an instruction for freeing heap area. In other words, freeing of memory in the part of the heap area that is allocated to objects is performed entirely by the garbage collector in Java, so that the garbage collector is responsible for deleting all of the 1000 objects generated inside the for loop in the above program.

However, it is generally well-known that execution of garbage collection by the garbage collector expends a great deal of time (processing cost). According to page 45 of the July 1998 issue of the monthly magazine *Java World*, published by IDG Communications, roughly 20% of the execution time in a standard Java application is occupied by garbage collection. Furthermore, applications including frequent repetition of allocation (reserving) and freeing (deallocation) of memory, of which generation of objects inside a loop is a representative example, devote a large proportion of execution time to garbage collection. This reduces the amount of time available for executing the application itself. Thus, even if optimizing program code has speeded up its execution, the effect of such improvements will be limited.

A further disadvantage of garbage collection is that it is impossible to estimate how long it will take to perform until it has been completed. This means that the risk of suspension of program execution or a dramatic drop in performance during garbage collection can never be entirely dismissed. This kind of risk may prove to be a fatal flaw when writing applications that demand an interactive processing thread and real-time implementation.

Since the dynamic memory management performed by Java execution threads includes garbage collection, as described above, Java is said to be unsuitable for writing programs which demand real-time implementation. However, it may be possible to overcome such problems by reducing some of the load placed on the execution thread by dynamic memory management (in other words by using some kind of mechanism to change the Java bytecode when compiling from source code into Java bytecode).

The following techniques disclosed in Japanese Laid-Open Patent 8-272621 and Japanese Laid-Open Patent 9-330232 both use a compiler to assist in dynamic memory management.

Japanese Laid-Open Patent 8-272621 discloses a technique for analyzing memory lifetimes, in which the malloc and free functions used in a source program for dynamically allocating and freeing memory in the heap area are changed to an alloca function for allocating and freeing dynamic memory inside a function stack at a higher processing speed.

Japanese Laid-Open Patent 9-330232 discloses a technique for analyzing lifetimes in a dynamically allocated memory, and changing the source program so that memory areas with lifetimes which do not overlap are grouped together, and memory in each group is shared. This reduces the need to call library functions for dynamically allocating and freeing memory.

However, both of these techniques share the following weaknesses:

(1) Since a lifetime of an allocated memory area is assumed to continue until a free instruction is issued by the program, lifetimes are still likely to be unnecessarily prolonged.

(2) The above change of functions cannot be applied if a free instruction is omitted from the program due to a programmer error (when manual memory management is used by a programming language such as C++) or if the programming language is not equipped for indicating memory freeing explicitly in the program (when automatic memory management is used by a programming language such as Java). As a result, there cannot be said to be sufficient reduction in the amount of dynamic storage management performed by the execution thread.

SUMMARY OF THE INVENTION

In view of the above problems, the object of the present invention is to provide a program conversion apparatus capable of reducing the amount of dynamic storage management placed on the execution thread when a program is executed.

A first program conversion apparatus relating to the invention converts a source program to an executable program, the source program including a first descriptor indicating dynamic memory allocation.

This program conversion apparatus includes a specifying unit for specifying in the source program a reference descriptor that is last to be executed from reference descriptors indicating references to memory allocated by the first descriptor; and a generating unit for generating an instruction for freeing the allocated memory at a position in the executable program immediately following an instruction that corresponds to the specified reference descriptor.

When an executable program written in Java or a similar programming language is executed, this construction prevents memory lifetimes from being unnecessarily prolonged, thereby reducing the amount of dynamic memory management performed by the execution thread.

A second program conversion apparatus relating to the invention converts a source program to an executable program, the source program including a first descriptor indicating dynamic memory allocation, and a second descriptor indicating memory allocation only when instructions are executed within a specified block.

This program conversion apparatus includes a specifying unit for specifying a lifetime of allocated memory by referring to positions in the source program of (1) the first descriptor and (2) reference descriptors indicating references to memory allocated by the first descriptor; a determining unit for determining whether the specified lifetime is confined within the specified block; and a generating unit for generating an instruction in an executable program when the specified lifetime is determined to be confined within the specified block, so that memory indicated as being allocated by the first descriptor in the source program is indicated as being allocated by the second descriptor.

When an executable program written in Java or a similar programming language is executed, this construction prevents memory lifetimes from being unnecessarily prolonged, thereby reducing the amount of dynamic memory management performed by the execution thread.

A third program conversion apparatus relating to the invention converts a source program to an executable program, the source program including a first descriptor indicating dynamic memory allocation for a specified object, a second descriptor indicating (1) repetition of instructions within a specified block and (2) a number of repetitions, and a third descriptor indicating continuous dynamic memory allocation for a specified plurality of objects.

This program conversion apparatus includes a specifying unit for specifying a position of the first descriptor in a source program; a determining unit for determining whether the specified position of the first descriptor is within the specified block; a detecting unit for detecting the number of repetitions shown by the second descriptor corresponding to the specified block; and a generating unit for generating an instruction in an executable program when the specified position of the first descriptor is determined to be within the specified block, so that memory, determined by repeating the memory allocation indicated by the first descriptor for the number of repetitions shown by the second descriptor, is indicated as being allocated by the third descriptor, the third descriptor being positioned outside the specified block.

When an executable program written in a programming language such as Java, C or C++ is executed, this construction prevents dynamic memory from being allocated each time a program block is repeated, thereby reducing the amount of dynamic memory management performed by the execution thread. Furthermore, the memory for each block repetition is allocated continuously, enabling the recycling performed in dynamic memory management to be performed effectively.

A fourth program conversion apparatus relating to the invention converts a source program to an executable program, the source program including a first descriptor indicating dynamic memory allocation for a specified object, a second descriptor indicating (1) repetition of instructions within a specified small block, and (2) a number of repetitions, and a third descriptor indicating continuous memory allocation for a specified plurality of objects only when instructions are executed within a specified large block that includes the specified small block.

This program conversion apparatus includes a specifying unit for specifying a lifetime of allocated memory, by referring to positions in the source program of (i) the first descriptor and (ii) reference descriptors indicating references to memory allocated by the first descriptor; a determining unit for determining whether the specified lifetime is confined within the specified large block and also whether the position of the first descriptor is within the specified small block; a detecting unit for detecting the number of repetitions shown by the second descriptor corresponding to the specified small block; and a generating unit for generating an instruction in the executable program when (a) the specified lifetime is determined to be confined within the specified large block and (b) the position of the first descriptor is determined to be within the specified small block, so that memory, determined by repeating the memory allocation indicated by the first descriptor for the number of repetitions shown by the second descriptor, is indicated as being allocated by the third descriptor, the third descriptor being positioned within the specified large block but outside the specified small block.

When an executable program written in Java or a similar programming language is executed, this construction prevents unnecessary dynamic memory allocation, thereby reducing the amount of dynamic memory management performed by the execution thread.

A fifth program conversion apparatus relating to the invention converts a source program to an executable program, the source program including a first descriptor indicating dynamic memory allocation, a second descriptor indicating repetition of instructions within a specified small block, and a third descriptor indicating memory allocation only when instructions are executed within a specified large block that includes the specified small block.

The program conversion apparatus includes a specifying unit for specifying a lifetime of allocated memory, by referring to positions in the source program of (1) the first descriptor and (2) reference descriptors indicating references to memory allocated by the first descriptor; a determining unit for determining whether the specified lifetime lasts for one execution duration of the specified small block; and a generating unit for generating an instruction for the executable program when the specified lifetime is determined to last for less than one execution duration of the specified small block, so that memory indicated as being allocated by the first descriptor in the source program is indicated as being allocated by the third descriptor, the third descriptor being positioned within the specified large block but outside the specified small block.

When an executable program written in Java or a similar programming language is executed, this construction prevents unnecessary dynamic memory allocation, thereby reducing the amount of dynamic memory management performed by the execution thread.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 14 shows program changes performed by the localizing processing;

FIG. 15 shows program changes performed by the continuous processing;

FIG. 16 shows program changes performed by the continuous localizing processing;

FIG. 17 shows program changes performed by the share processing; and

DESCRIPTION OF THE PREFERRED EMBODIMENTS

The following is a description of a program conversion apparatus in an embodiment of the invention with reference to the drawings.

Figure 1:
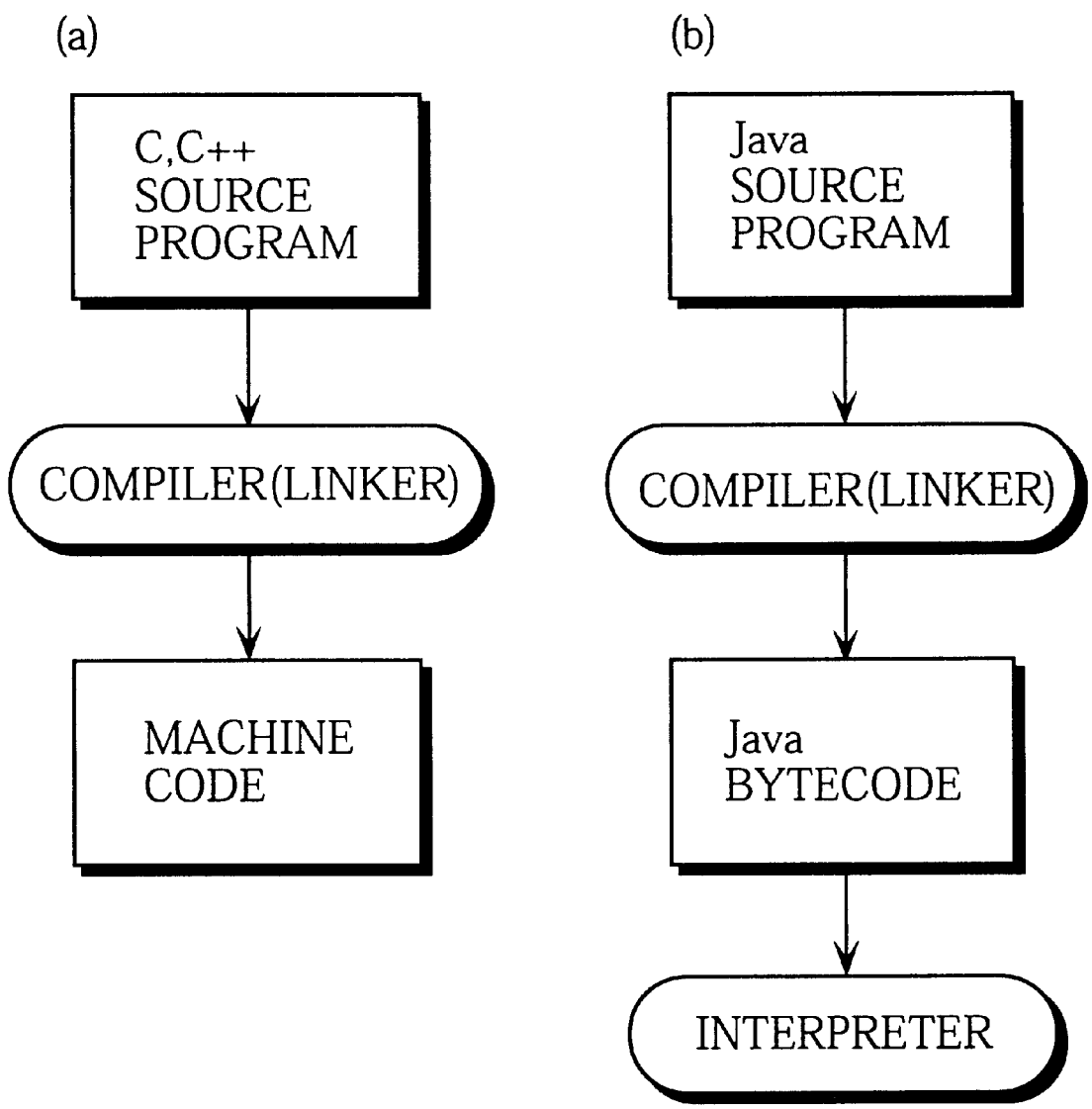
FIG. 1 shows the generation of execution-format code in C, C++ and Java.
Figure 2:
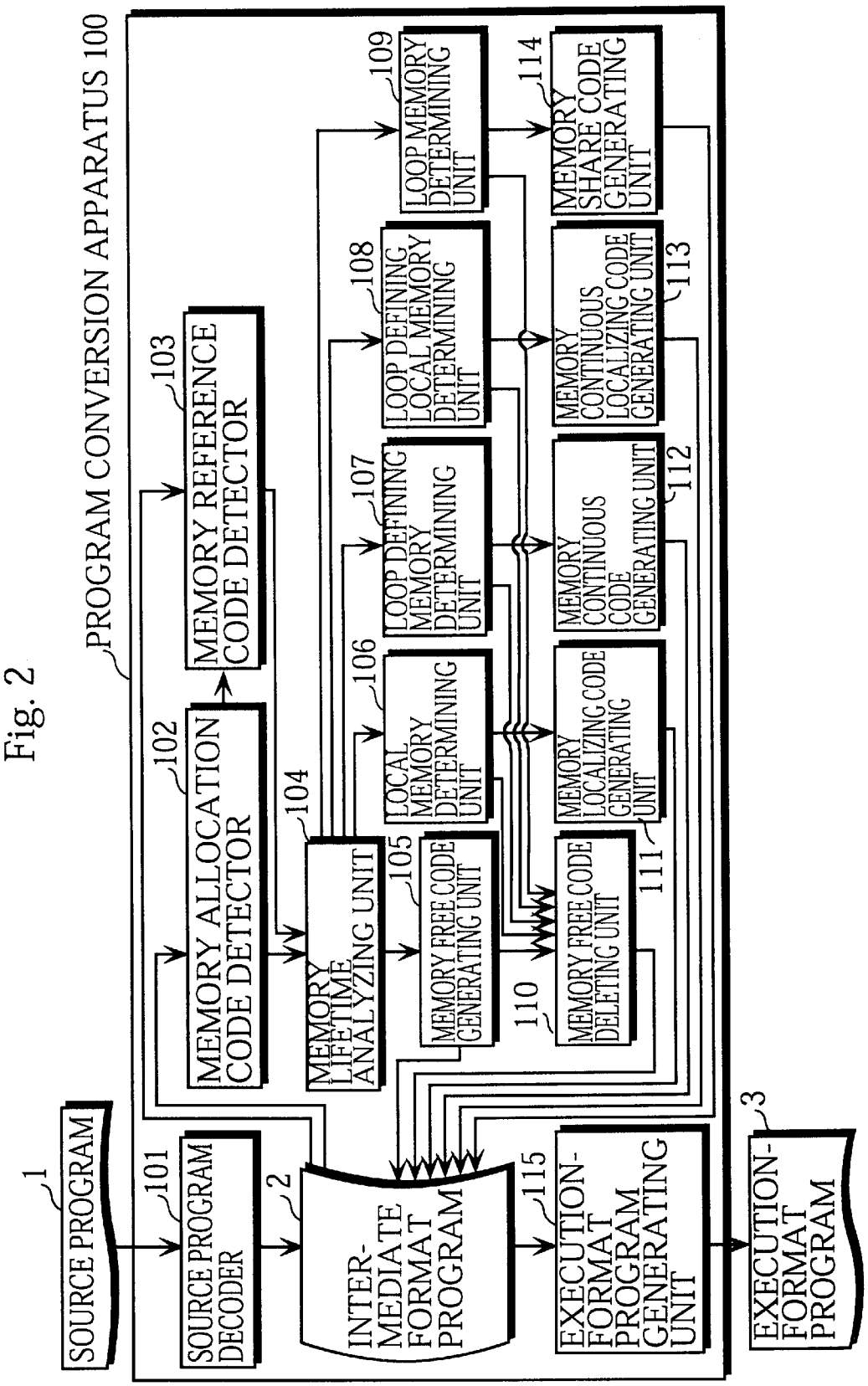
FIG. 2 is a block diagram showing the overall construction of a program conversion apparatus 100 in a first embodiment of the invention.

FIG. 2 is a block diagram showing an overall construction of a program conversion apparatus 100 in a first embodiment of the invention. The program conversion apparatus 100 is actually constructed from hardware, including a CPU, memory, an external memory device, an input device and a display, but the drawing shows a construction for software that is executed by such hardware. In the following explanation, the expression 'memory lifetime is local' means that memory is allocated for a variable, object or the like, when execution of instructions inside a designated block (program section) is started, and the allocated memory is freed when execution of the instructions inside the designated block has been completed. One example of such a block is execution of a single function. In contrast, suppose that an address for the dynamically allocated memory is itself specified as an argument when a function is called. In this case, the address itself is likely to be referenced by the called function, so that the lifetime of the memory cannot be limited to a single function, and thereby cannot be described as a local lifetime.

As shown in FIG. 2, the program conversion apparatus 100 generates an executable program 3 from a source program 1. The program conversion apparatus 100 includes, in the same way as a conventional program conversion apparatus, a source program decoder 101, a memory allocation code detector 102, a memory reference code detector 103, a memory lifetime analyzing unit 104 and an executable program generating unit 115. The source program decoder 101 converts the source program 1 to an intermediate format program 2. The memory allocation code detector 102 detects codes for dynamically allocating memory in the intermediate format program 2 (codes corresponding to malloc in C, and new in each of C++ and Java), and outputs data from the intermediate format program 2 that specifies these allocation codes. The memory reference code detector 103 detects codes referencing each allocated memory area based on the output from the memory allocation code detector 102, and outputs data in the intermediate format program 2 that specifies these reference codes. The memory lifetime analyzing unit 104 analyzes memory lifetimes based on the allocation codes detected by the memory allocation code detector 102 and the reference codes detected by the memory reference code detector 103. The executable program generating unit 115 converts the intermediate format program 2 into an executable program 3.

The program conversion apparatus 100 also includes a memory free code generating unit 105 and a memory free code deleting unit 110 that are particularly relevant to the invention. The memory free code generating unit 105 inserts a code for freeing memory immediately after the point at which a lifetime ends, based on a lifetime output from the memory lifetime analyzing unit 104. When the source program 1 is written in a language which includes an explicit instruction for dynamically freeing memory, the memory free code deleting unit 110 deletes, from the intermediate format program 2, code written by the programmer for dynamically freeing memory (free for C, delete for C++ and the like).

The program conversion apparatus 100 also includes a local memory determining unit 106, a loop defining memory determining unit 107, a loop defining local memory determining unit 108, a loop memory determining unit 109, a memory localizing code generating unit 111, a memory continuous code generating unit 112, a memory continuous localizing code generating unit 113, and a memory share code generating unit 114, all of which are connected to the invention. The local memory determining unit 106 determines whether a condition A, 'the memory lifetime is local' is satisfied, based on a lifetime output from the memory lifetime analyzing unit 104. The loop defining memory determining unit 107 determines whether a condition B, 'the starting point for the memory lifetime is inside a loop having a calculable number of repetitions' is satisfied. The loop defining local memory determining unit 108 determines whether the memory area concerned simultaneously satisfies both condition A and condition B. The loop memory determining unit 109 determines whether a condition C, 'the memory lifetime is confined to one loop repetition' is satisfied. When the local memory determining unit 106 has determined that condition A is satisfied, the memory localizing code generating unit 111 changes the intermediate format program 2 so that memory indicated as being dynamically allocated is allocated as memory for a local variable. When the loop defining memory determining unit 107 has determined that condition B is satisfied, the memory continuous code generating unit 112 changes the intermediate format program 2 so that memory indicated as being dynamically allocated to a loop having a plurality of repetitions is allocated (dynamically and continuously) immediately prior to the loop, as memory for a dynamic array variable. When the loop defining local memory determining unit 108 has determined that conditions A and B are simultaneously satisfied, the memory continuous localizing code generating unit 113 changes the intermediate format program 2 so that memory that is indicated as being dynamically allocated to a loop having a plurality of repetitions is allocated inside the block including the loop, as memory for a local array variable. When the loop memory determining unit 109 has determined that condition C is satisfied, the memory share code generating unit 114 changes the intermediate format program 2 so that memory indicated as being dynamically allocated is used so that it can be shared during processing of a repeated loop.

A program conversion apparatus 100 having the above construction performs the following processing, as shown in FIGS. 3 to 5, and FIGS. 10 to 13.

Figure 3:
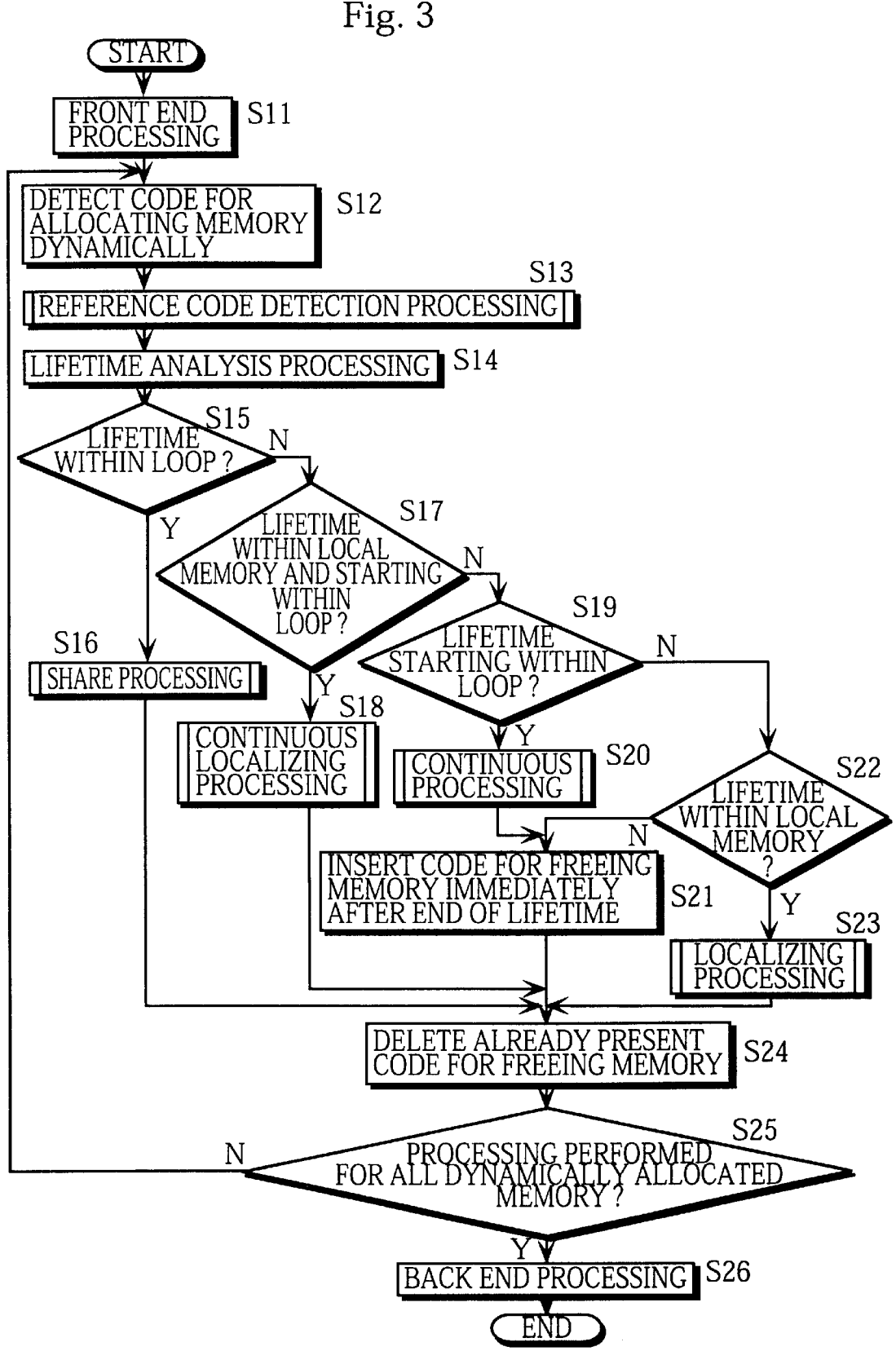
FIG. 3 is a flowchart showing an outline of processing performed by the program conversion apparatus 100.
Figure 4:
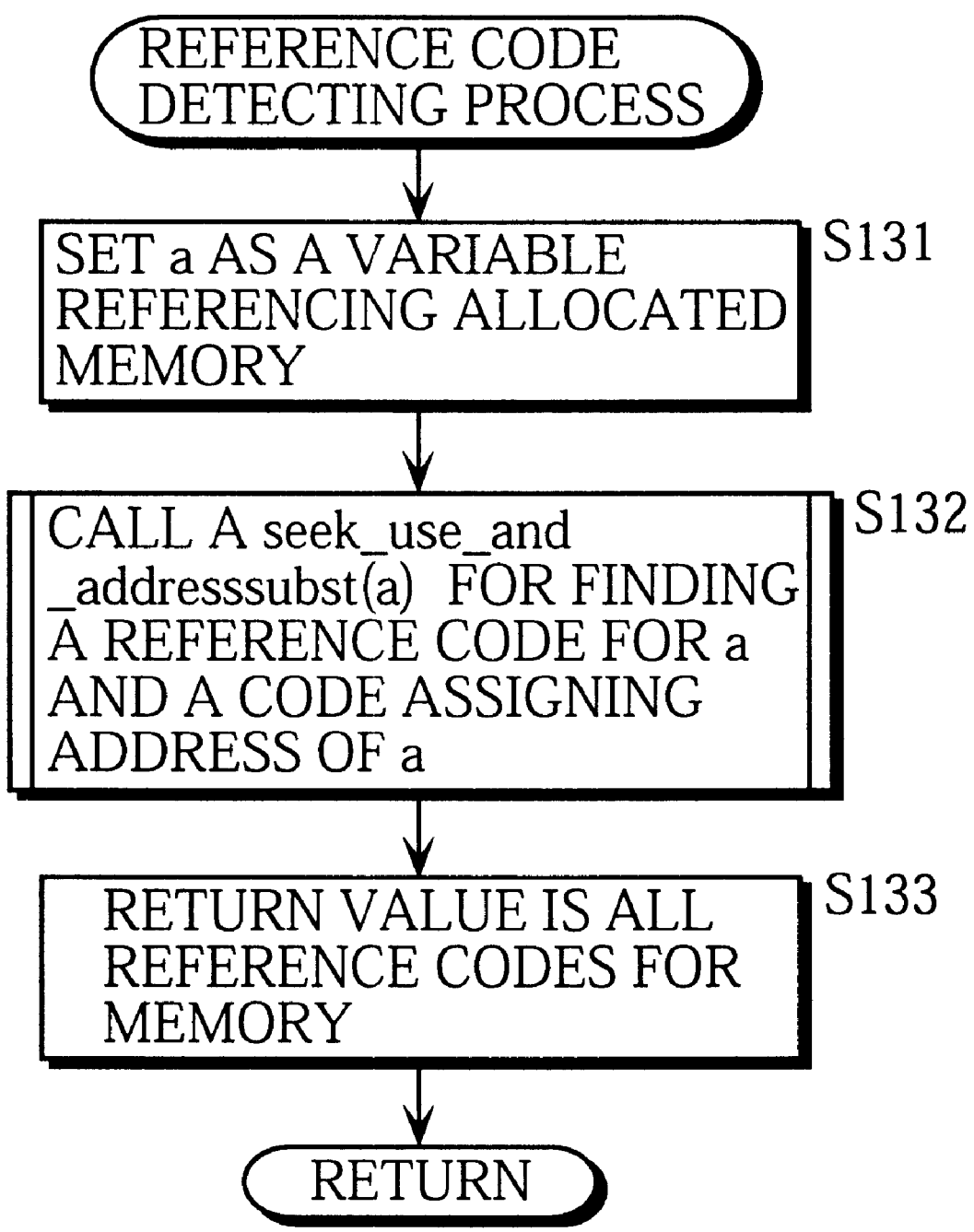
FIG. 4 is a is a flowchart showing a reference code detection process in S13 of FIG. 3.
Figure 5:
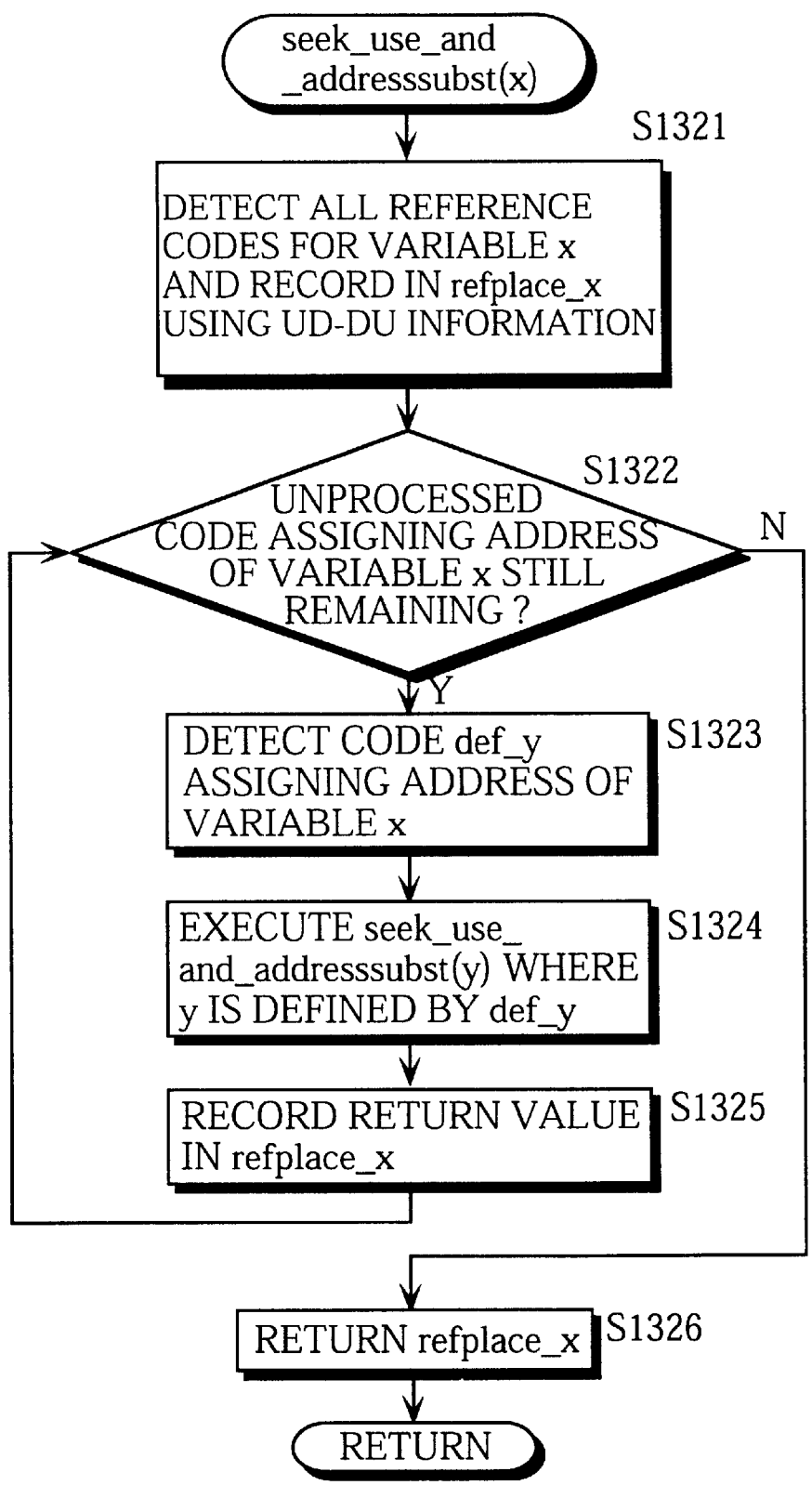
FIG. 5 is a flowchart showing a process for calling a subroutine seek_use_and$_{13}$ addresssubst (a) in S132 of FIG. 4.

FIG. 3 is a flowchart showing an outline of processing performed by the program conversion apparatus 100. FIG. 4 is a flowchart showing a reference code detecting process in S13 of FIG. 3. FIG. 5 is a flowchart showing a process for calling a subroutine seek_use_and_addresssubst (a) in S132 of FIG. 4.

Figure 6:
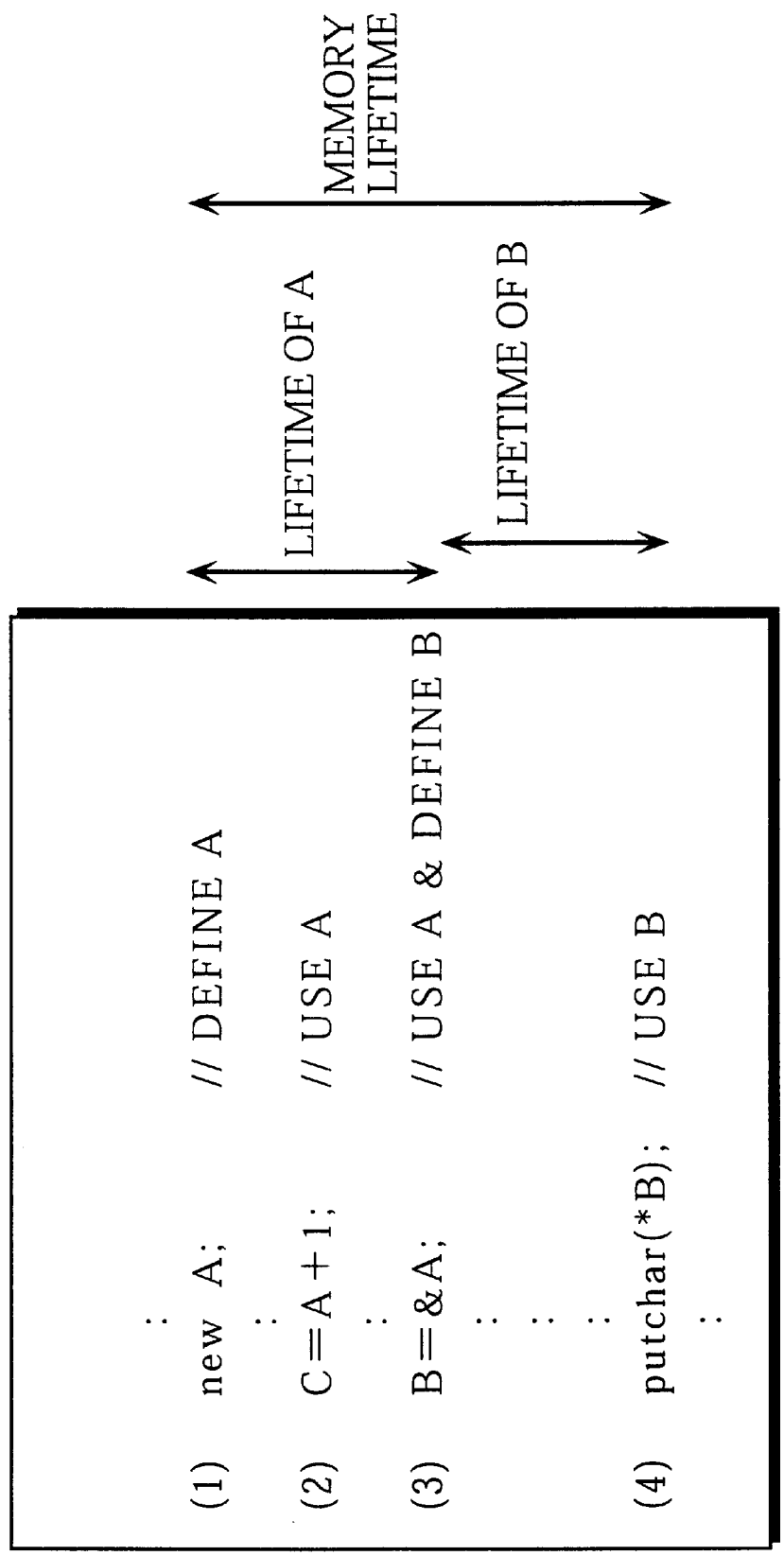
FIG. 6 shows an example of a first program illustrating processing performed by a memory reference code detector 103 and a memory lifetime analyzer 104.
Figure 7:
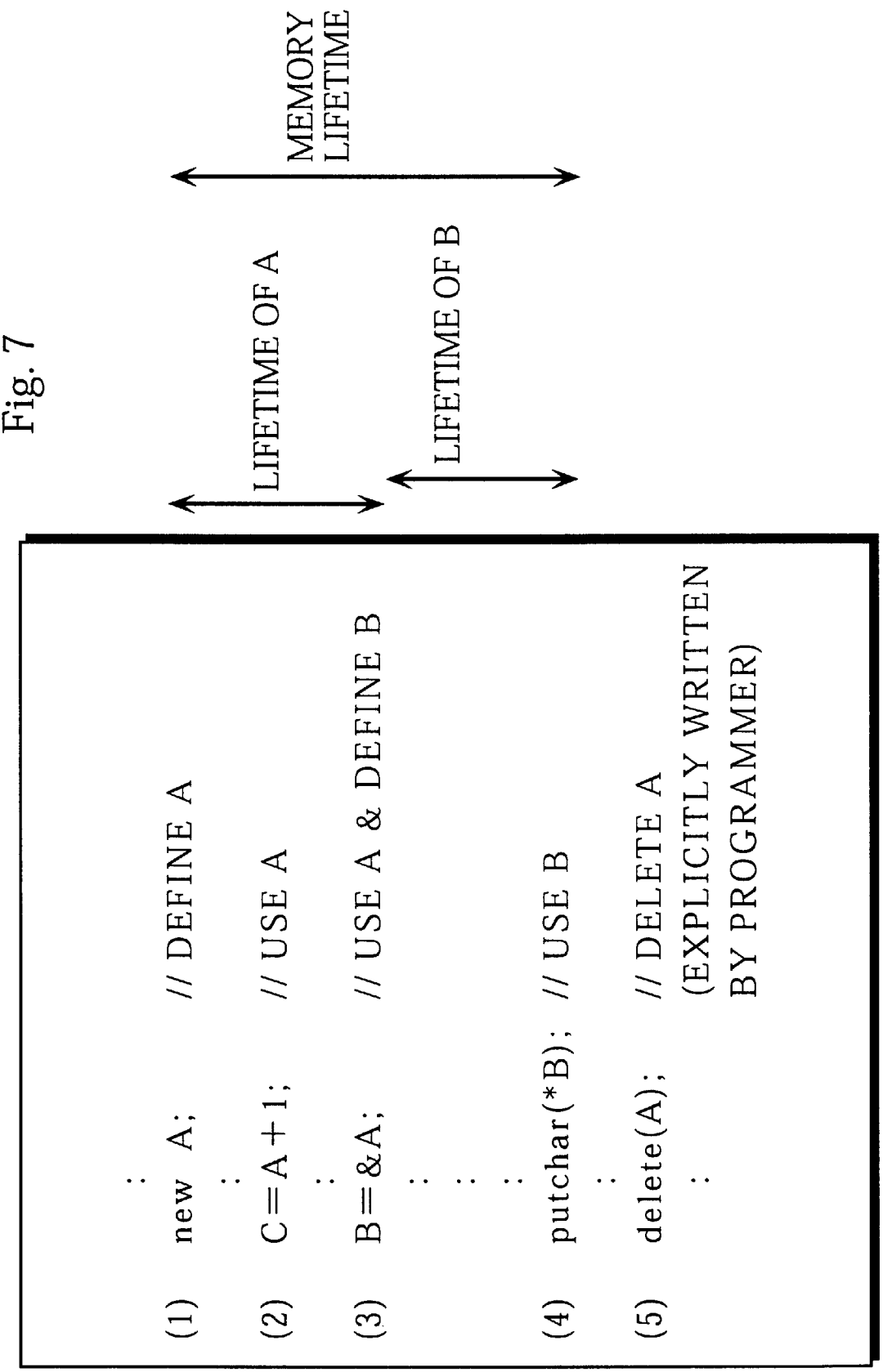
FIG. 7 shows an example of a second program illustrating processing performed by the memory reference code detector 103 and the memory lifetime analyzer 104.
Figure 8:
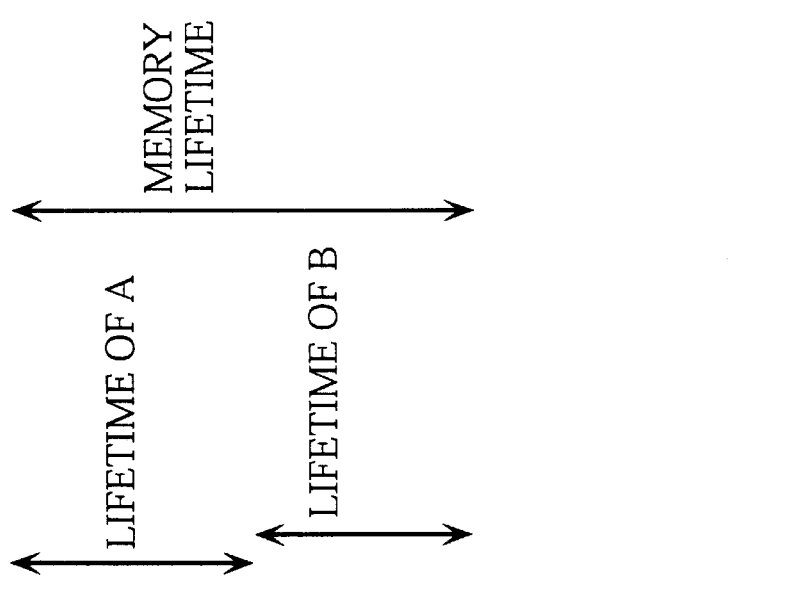
FIG. 8 illustrates processing performed by a memory free code generating unit 105 on the program shown in FIG. 7.
Figure 9:
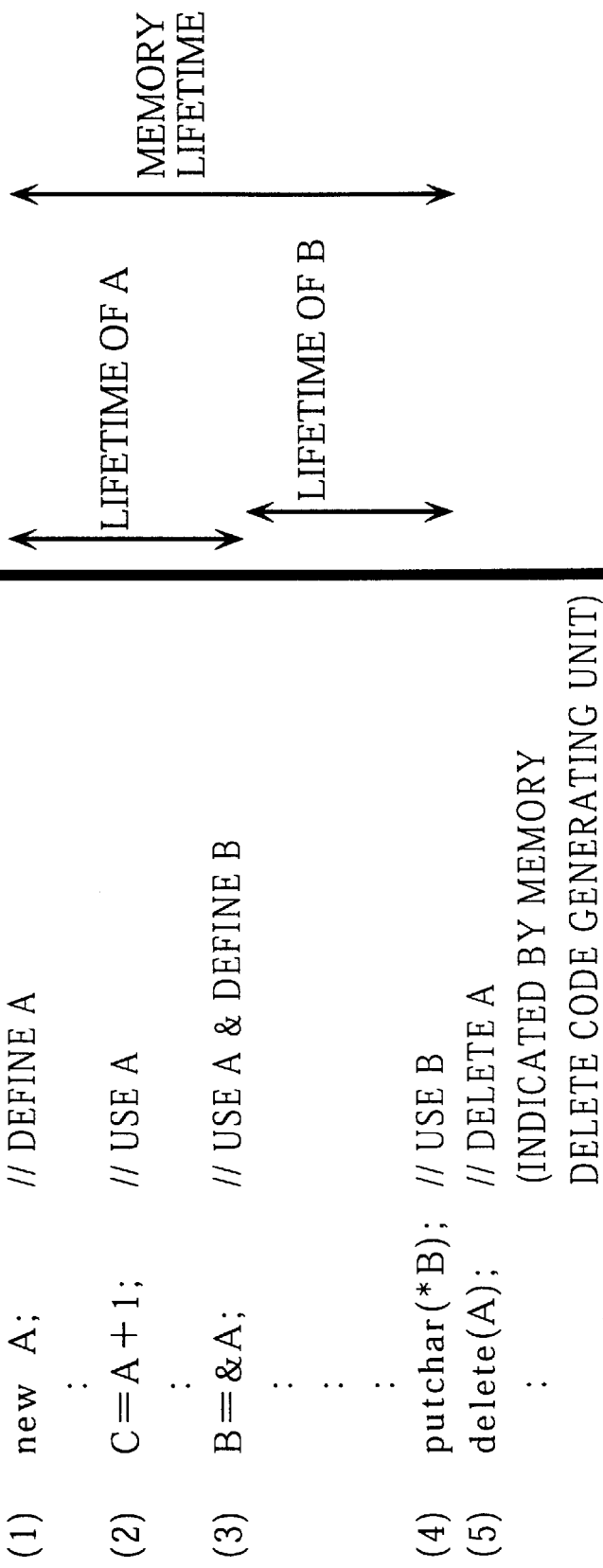
FIG. 9 illustrates processing performed by a memory free code deleting unit 110 on the program shown in FIG. 8.

FIGS. 6 and 7 show example programs illustrating processing performed by the memory reference code detector 103 and the memory lifetime analyzing unit 104, FIG. 8 illustrates processing performed by the memory free code generating unit 105 on the program shown in FIG. 7, and FIG. 9 illustrates processing performed by the memory free code deleting unit 110 on the program shown in FIG. 8. Note that the following explanation uses a program written in C++, but the invention may be applied in a similar way to C, Java and the like. Numerical references (1) to (4) and the like in FIG. 6 denote signals specifying code. Codes unrelated to variable A, variable B or their respective allocated memory areas may be inserted between code (1) and code (4) in FIG. 6 and between code (1) and code (5) in FIG. 7. Furthermore, program changes like the ones shown in FIGS. 8 and 9 are actually performed on the intermediate format program 2, but corresponding source programs 1 written in C++ are shown here for ease of explanation.

In FIG. 3, the source program decoder 101 in the program conversion apparatus 100 (see FIG. 2) first performs front-end processing in the same way as in a conventional program conversion apparatus, thereby converting the source program 1 into the intermediate format program 2 (S11). Following this, the memory allocation code detector 102 detects, from the intermediate format program 2, codes having a specific format (i.e malloc in C. new in C++ and Java), that are used for dynamically allocating memory to variables, array variables, objects and the like (S12). Then, the memory reference code detector 103 performs reference code detecting processing for detecting reference codes to memory allocated by codes detected in the intermediate format program 2 at S12 (S13).

DU (defined-use) information and UD (use-defined) information obtained by data-flow analysis are used in reference code detection. The technique of data-flow analysis is described in more detail in Compilers: Principles, Techniques, and Tools by Alfred V. Aho, Ravi Sethi and Jeffrey D. Ullman, pub. Addison-Wesley 1985.

DU information and UD information are used to detect codes showing definitions and uses for variables and the like in an intermediate format program 2, but such information does not show definitions and uses for memory directly. In other words, when a variable is assigned to a dynamic memory address for a variable that has already been defined, there is a possibility that dynamic memory for the already defined variable may be referenced as memory for another variable.

Here, the memory reference code detector 103 performs detection of reference codes that are assumed to belong to already allocated dynamic memory, including a code assigning a variable to a dynamic memory address for another variable, and code referencing memory for the new variable.

The memory reference code detection processing performed by the memory reference code detector 103 is described in more detail with reference to FIGS. 4 to 7. Memory reference code detection processing finds a reference code to a variable x and a code assigning an address at which a variable x is stored (the content of this processing is shown in FIG. 5). This processing is realized by using a recursive function seek_use_and$_{13}$ addresssubst(a).

In the reference code detection processing of FIG. 4, a variable referencing allocated memory is defined as a (S131). Then a subroutine seek_use_and_addresssubst(a) is called. This subroutine is used to find a reference code for a and a point assigning the address of a (S132). The return value refplace_x for the subroutine seek_use_and_addresssubst(a) is stored so as to include all reference codes showing memory for the variable a (S133).

Furthermore, in the subroutine seek_use_and_addresssubst(a) shown in FIG. 5, all the reference codes for the variable x are detected from DU information and UD information, and recorded in refplace_x (S1321). Following this, determination of whether an unprocessed code assigning an address to the variable x is still remaining is performed (S1322).

If an unprocessed code is still remaining (S1322: Yes), this code assigning an address to the variable x is detected as def_y (S1323). A variable y is defined by def_y, and seek_use_and_addresssubst(y) is executed (S1324). The return value for seek_use_and_addresssubst(y) is stored in refplace_x (S1325).

If no unprocessed code remains (S1322: No), refplace_x is set as the return value (Sl326) and the processing is completed.

In the program of FIG. 6, memory dynamically allocated to a variable A by a code (1) is referenced by codes (2) and (3) stipulating uses of variable A. Code (3) defines a variable B by assigning the address of variable A to variable B. This definition references the memory for variable A. In a program like the one in FIG. 6, the memory reference code detector 103 performs reference code detection processing (FIG. 4), treating all of codes (1) to (4) as reference codes referring to a same memory area, and outputs data showing the reference codes to the memory lifetime analyzing unit 104.

When reference code detection processing (FIG. 3, S13) performed by the memory reference code detector 103 has been completed, lifetimes are analyzed by the memory lifetime analyzing unit 104 (FIG. 3, S14).

Lifetime analysis is explained with reference to FIGS. 6 and 7.

In the program shown in FIG. 6, all of the codes (1) to (4) can be assumed to be reference codes for the same memory area, as a result of reference code detection processing performed by the memory reference point detector 103. The memory lifetime analyzing unit 104 receives input data showing these reference codes, treats an interval including lifetimes for variables A and B as the lifetime for the corresponding memory area, and outputs data showing the interval to the memory free code generating unit 105, the local memory determining unit 106, the loop defining memory determining unit 107, the loop defining local memory determining unit 108 and the loop memory determining unit 109.

Here, when the memory lifetime analyzing unit 104 uses a language like C or C++ which allows the programmer to write a code for freeing memory in the source program 1, the memory lifetime is defined as extending until the last code to be referenced, rather than extending as far as the memory free code. Allocated memory is classified as garbage by the program immediately following a point where the last code to be referenced is written, thus excluding the code for freeing memory.

In other words, since the code (5) in the program shown in FIG. 7 for freeing variable A also refers to the memory area for variable A, the memory reference code detector 103 detects this code as a reference code according to the DU and UD information. However, since code (5) is a code for freeing memory, the memory lifetime analyzing unit 104 does not detect the point where code (5) is written as the end of the lifetime, instead determining the memory lifetime to be the interval extending from code (1) to code (4) (identical to the equivalent part of the program shown in FIG. 6).

Once the memory lifetime analyzing unit 104 has completed lifetime analyzing processing (FIG. 3, S14), the loop memory determining unit 109 determines whether the lifetime of the allocated memory corresponding to the code detected in S12 is confined within one loop repetition, i.e. whether condition C is satisfied (S15). If the lifetime is confined within one loop repetition (S15: Yes), the memory share code generating unit 114 performs share processing (S16) and processing moves to S24. The procedure for performing share processing is described in more detail later in this specification with reference to the flowchart in FIG. 13.

If the lifetime is not confined to one loop repetition (S15: No), the loop defining local memory determining unit 108 determines both whether the lifetime is local and whether the starting point of the interval is within a loop having a calculable number of repetitions, i.e. whether conditions A and B are simultaneously satisfied (S17). If the lifetime is local and within a loop having a calculable number of repetitions (S17: Yes), the memory continuous localizing code generating unit 113 performs continuous localizing processing (explained later with reference to FIG. 12) (S18) and processing moves to S24.

Note that the number of loop repetitions is normally determined by analyzing a conditional expression that is indicated together with the code describing the loop. However, it may be impossible to specify the number of loop repetitions if a loop indicates a comparison using an unpredictable variable as its conditional expression. In this case, the number of loop repetitions is described as incalculable.

If the lifetime does not satisfy both conditions A and B (S17: No), the loop defining local memory determining unit 108 determines whether it has a starting point within a loop having a calculable number of repetitions, i.e. whether it satisfies condition B (S19). If the lifetime has a starting point within such a loop (S19: Yes), the memory continuous code generating unit 112 performs continuous processing (described later in the specification with reference to FIG. 11) (S20), the memory free code generating unit 105 inserts a code for freeing memory immediately following the end of the lifetime (S21), and processing then moves to S24. Specifically, processing is performed by the memory free code generating unit 105 on the program shown in FIG. 7. This means that a code (5) for freeing the variable A is inserted in the program, in addition to an identical code (6) already written by the programmer. The resulting program resembles the one shown in FIG. 8.

If the lifetime is not within a loop having a calculable number of repetitions (FIG. 3, S19: No), the loop defining local memory determining unit 108 determines whether it is local, i.e. satisfies condition A (S22). If the lifetime is local (S22: Yes), the memory localizing code generating unit 111 performs localizing processing (described later with reference to FIG. 10) (S23), and processing moves to S24. If the lifetime is not local (S22: No), a code for freeing memory is inserted immediately following the lifetime, at S21, and processing moves to S24.

At S24, a code generated in the intermediate format program 2 by the front end processing (S11) that has already been detected by the memory reference code detector 103, is deleted by the memory free code deleting unit 110. This code corresponds to a code (free in C, delete in C++, and so on), originally written in source program 1 by the programmer, for freeing dynamic memory. Specifically, the memory free code deleting unit 110 performs processing on the program shown in FIG. 8, so that a code written by the programmer for freeing memory relating to variable A is deleted, resulting in the program shown in FIG. 9. In other words, a code like the one in FIG. 7, for freeing memory relating to variable A that has not been freed even though its lifetime has ended, is moved to a position immediately following the lifetime for A, as shown in FIG. 9.

Following this, in S25 of FIG. 3, the program conversion apparatus 100 determines whether the above processing has been performed on all dynamically allocated memory. If it has not been performed on all dynamically allocated memory (S25: No), the processing of S12 onwards is performed for the unprocessed memory, and when the above processing has been performed for all dynamically allocated memory (S25: Yes), the executable program generating unit 115 performs back end processing in the same way as in a conventional program conversion apparatus, thereby converting the intermediate format program 2 to an executable program 3 (S26). This completes the processing.

The following explanation describes in more detail those parts of the above-outlined processing performed by the program conversion apparatus 100 that are particularly relevant to this invention. The localizing processing of S23, the continuous processing of S20, the continuous localizing processing of S18, and the share processing of S16 are explained with reference to FIGS. 10 to 13 respectively. FIGS. 14 to 17 show programs changed by these processes. In reality these changes take place within the intermediate format program 2, but for the sake of convenience, corresponding source programs 1 written in C++ are shown.

Figure 10:
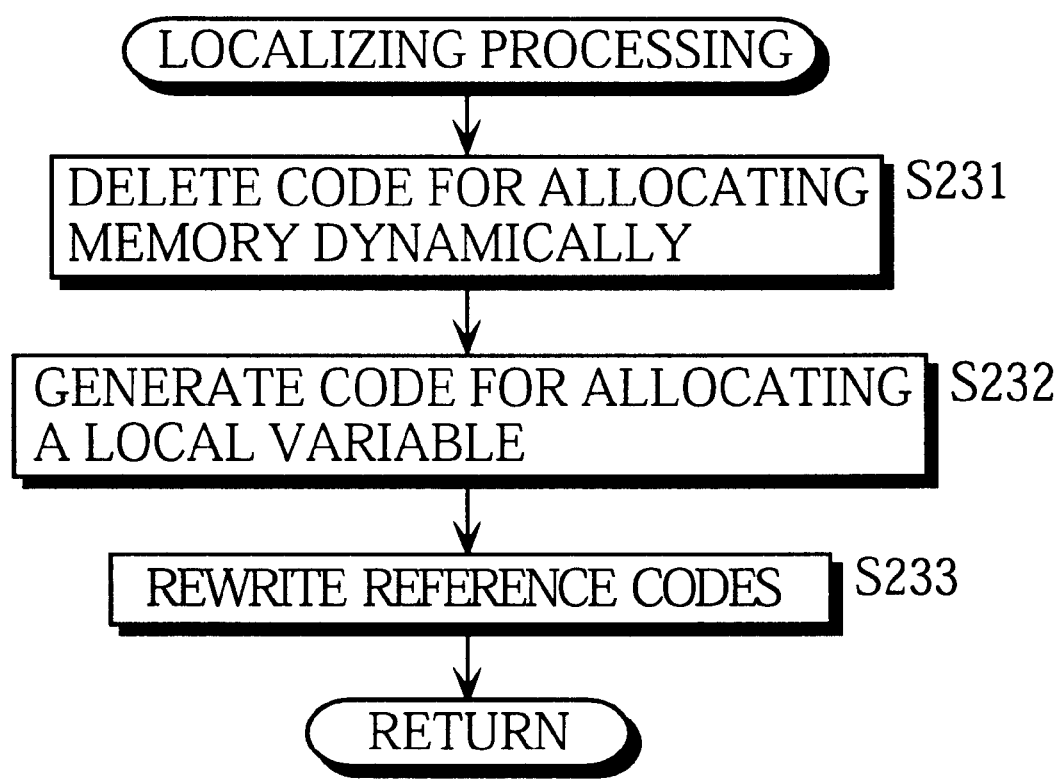
FIG. 10 is a flowchart showing in detail localize processing performed by a memory localizing code generating unit 111 in S23 of FIG. 3.

FIG. 10 is a flowchart showing in detail localizing processing performed by the memory localizing code generating unit 111 in S23 of FIG. 3.

The memory localizing code generating unit 111 (FIG. 2) changes the intermediate program 2 so that a memory area determined to have a local lifetime, i.e. to satisfy condition A, by the local memory determining unit 106, is allocated to a local variable rather than being allocated dynamically.

More specifically, in the localizing processing shown in FIG. 10, a code (for example malloc in C, or new in C++ and Java) for dynamically allocating a memory area m is deleted (S231). Then a code for allocating a memory area 1 to a local variable having the same size and shape as the variable that was allocated to memory area m is generated (S232). Next, all codes referencing memory area m are changed to codes referencing memory area 1 (S233), and the processing is for a plurality of loop repetitions.

Figure 11:
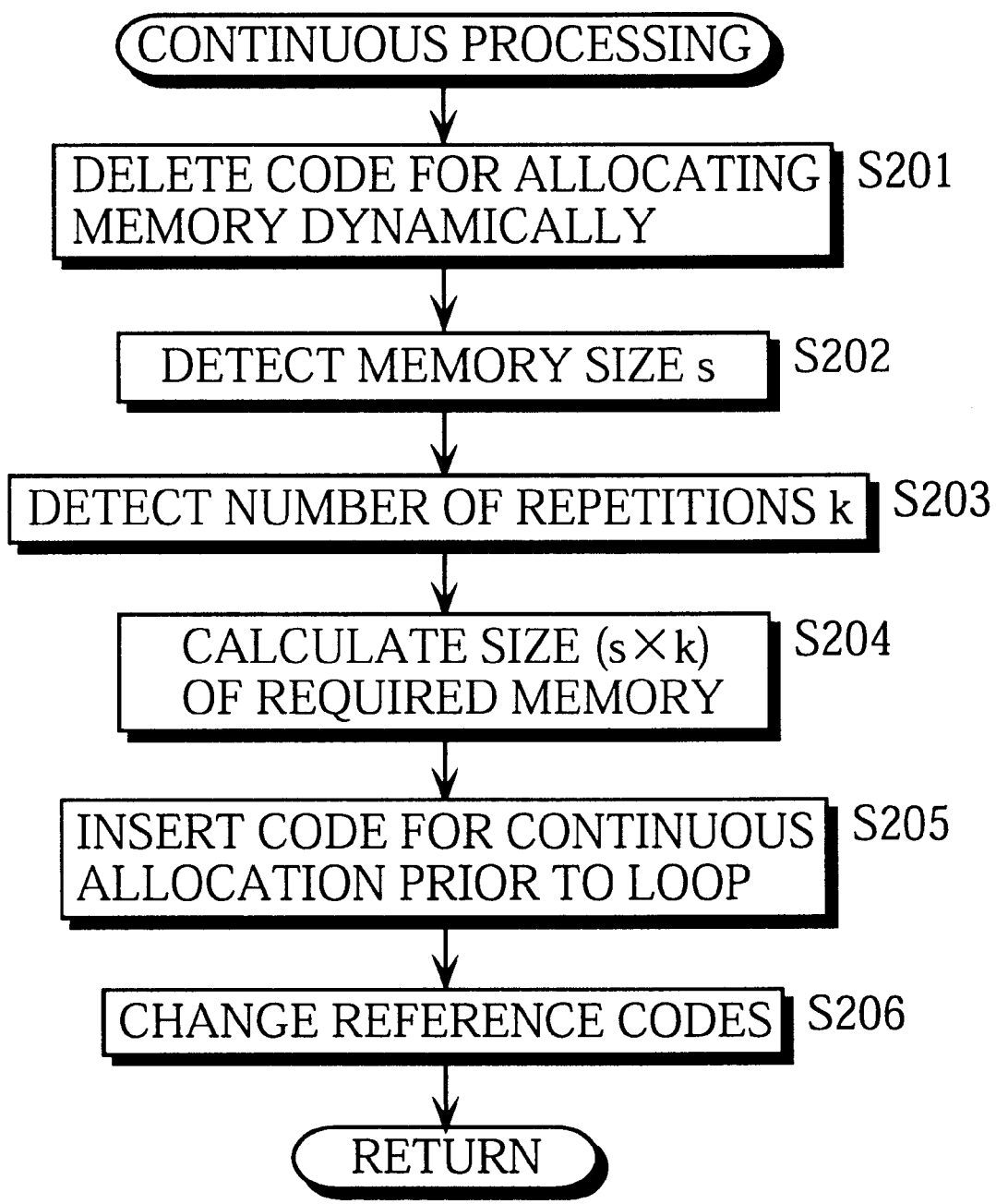
FIG. 11 is a flowchart showing in detail continuous processing performed by a memory continuous code generating unit 112 in S20 of FIG. 3.

Specifically, in the continuous processing shown in FIG. 11, a code dynamically allocating the memory area m is deleted (S201) and a size s and number of loop repetitions k are detected for the allocated memory area m (S202, S203). Then the total size (s×k) of the area to be allocated for the loop is calculated (S204). Next, a code for allocating a memory area aw having a size of (s×k) is inserted outside the loop, immediately prior to the start of the loop execution (S205). All the codes referencing the memory area m are then changed to codes referencing the memory area aw (S206) and the processing is completed.

When the program is changed, the memory area to be referenced is indicated by finding addresses add that should be newly referenced inside the memory area aw. This is achieved by repeating the following formula for each of a number of loop repetitions i (i=1, 2, 3 . . . k):

add=(a first address for memory area aw)+[s×(i−1)].

FIG. 15 shows the change in the program caused by continuous processing. FIG. 15A shows a program prior to the performance of continuous processing, and FIG. 15B shows a program following the performance of continuous processing.

In the program shown in FIG. 15A, a code (1) dynamically completed.

FIG. 14 shows program changes made by the localizing processing. FIG. 14A shows a program prior to the performance of localizing processing, and FIG. 14B shows a program following the performance of localizing processing.

In the program shown in FIG. 14A, memory is dynamically allocated by a code (1), and the allocated memory is referenced by each of codes (2) to (4), but since the lifetime for this memory is local, it can be localized using the localizing processing shown in FIG. 10.

In this processing, as shown in FIG. 14B, a code (1) that was present in the program before localizing was performed is deleted, and a code (11) allocating memory to a local variable is inserted instead. The memory allocated by code (11) is referenced by codes (12) to (14).

FIG. 11 is a flowchart showing in detail the continuous processing performed by the memory continuous code generating unit 112 in S20 of FIG. 3.

The memory continuous code generating unit 112 (FIG. 2) changes the intermediate format program 2 so that a memory area having a lifetime with a starting point determined by the loop defining memory determining unit 107 to be within a loop having a calculable number of repetitions is allocated continuously allocates memory within a for loop, codes (2) and (3) each reference the allocated memory, and code (4) enables the address of an allocated memory area to be used as an argument when a function is called. Since the program contains the code (4), the lifetime of the memory is not local, but the starting point of the lifetime is within a loop having a calculable number of repetitions, so the continuous processing in FIG. 11 can be performed.

Specifically, continuous processing is performed as shown in FIG. 15B, so that a code (1) which existed in the program prior to continuous is deleted, and a code (11) allocating memory to an array variable is instead inserted prior to the start of the for loop. Codes (12) to (14) each reference the memory allocated by code (11).

Figure 12:
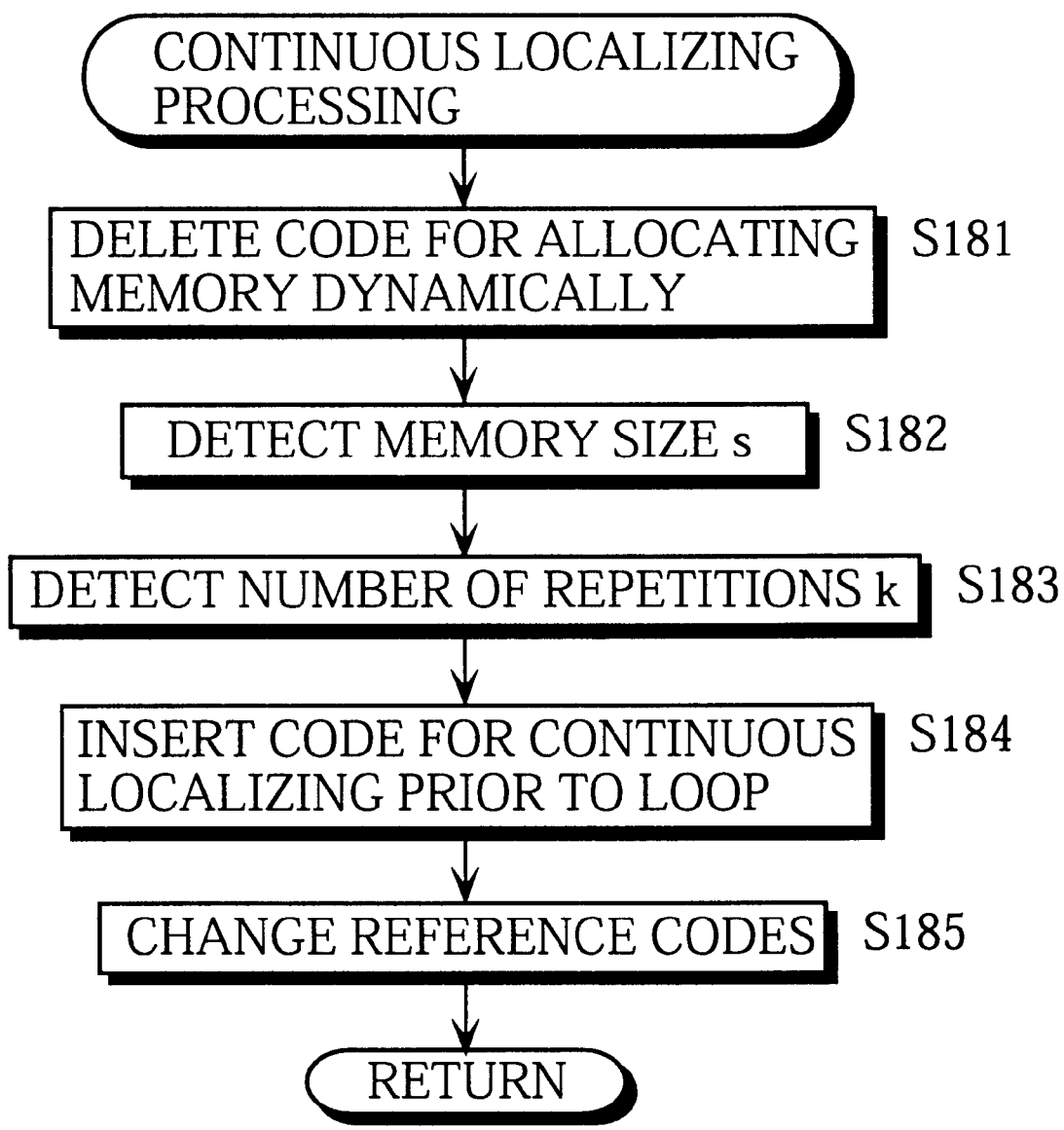
FIG. 12 is a flowchart showing in detail continuous localizing processing performed by a memory continuous localizing unit 113 in S18 of FIG. 3.

FIG. 12 is a flowchart showing in detail the continuous localizing processing performed by the memory continuous localizing code generating unit 113 in S18 of FIG. 3.

The memory continuous localizing code generating unit 113 (FIG. 2) changes the intermediate format program 2 so that a memory area determined by the loop defining local memory determining unit 108 to have a local lifetime and also to have a lifetime starting point that is within a loop having a calculable number of repetitions, i.e. that simultaneously satisfies conditions A and B, is allocated to a local array variable rather than being allocated dynamically.

Specifically, in the continuous localizing processing shown in FIG. 12, a code dynamically allocating a memory area m is deleted (S181) and a size s and number of loop repetitions k are detected for the allocated memory area m (S182, S183). Next, a code for allocating a local array variable L is inserted. The variable L has elements of the same size and shape as the variable allocated to the memory area m, the number of elements being equal to the number of loop repetitions k (S184). All the codes referencing the memory area m are then changed to codes referencing the memory areas for the elements for the local array variable L (S185), and the processing is completed.

When the codes are changed, the memory to be referenced is indicated by finding an address add for the memory area corresponding to each element in the array variable L. This is achieved by repeating the following formula for each of a number of loop repetitions i (i=1, 2, 3 . . . k):

add=(a first address of the memory+{s×(i−1)}. for array variable L)

FIG. 16 shows program changes caused by the continuous localizing processing. FIG. 16A shows a program prior to the performance of continuous localizing processing, and FIG. 16B shows the program following the performance of continuous localizing processing.

In the program shown in FIG. 16A, a code (1) dynamically allocates memory within a for loop, and codes (2) to (4) each reference the allocated memory, but since the lifetime of the memory is local, and the starting point of the lifetime is within a loop having a calculable number of repetitions, the continuous localizing processing of FIG. 12 is possible.

Note that since the memory area referenced in this program is not confined to one loop repetition, memory cannot be shared (memory share processing is described later in the specification). In other words, in the program shown in FIG. 16A, the address of a memory area allocated by the code (1) in a loop when i=4, is held as a variable b using a code (4), and referenced by a code (2) in a next loop when i=5.

Specifically, in the continuous localizing processing shown in FIG. 16B, a code (1) which existed in the program prior to continuous localizing is deleted, and a code (11) allocating memory to an array variable having a number of elements equal to the number of for loop repetitions is inserted instead, prior to the start of the for loop. Here, each element in the array variable is a local variable. Codes (12) to (14) each reference the memory allocated by code (11).

Figure 13:
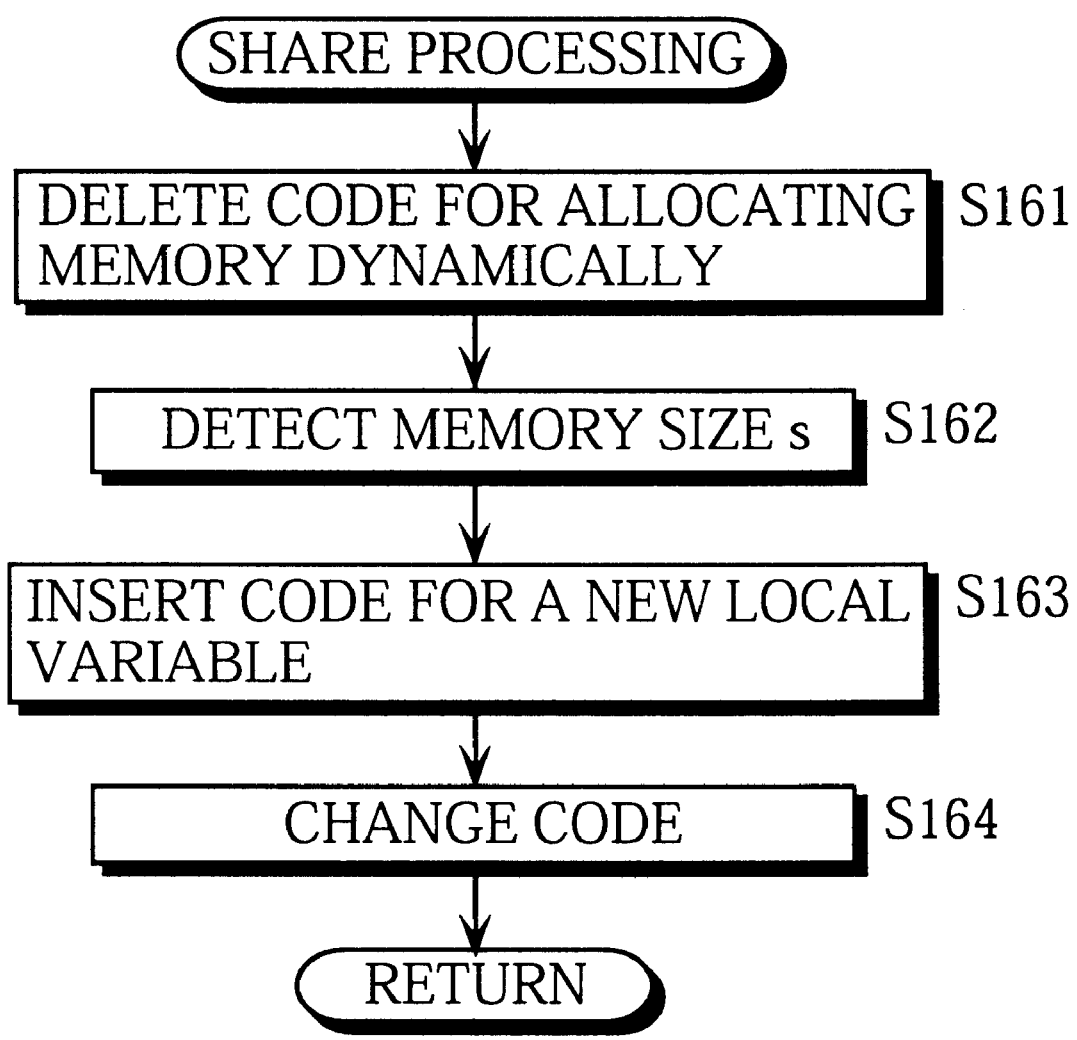
FIG. 13 is a flowchart showing in detail share processing performed by a memory share code generating unit 114.

FIG. 13 is a flowchart showing in detail share processing performed by the memory share code generating unit 114 in S16 of FIG. 3.

The memory share code generating unit 114 (FIG. 2) changes the intermediate format program 2 so that memory determined by the loop memory determining unit 109 to have a lifetime confined to one loop repetition i.e to satisfy condition C, is shared. This means that, instead of the memory being allocated dynamically, the same memory is used for a plurality of loop repetitions.

Memory having a lifetime confined to one loop repetition becomes 'garbage' the next time the loop is repeated. Since there is no need to allocate variables dynamically to this kind of memory, its lifetime is clearly local. This means that a memory area allocated to a local variable can be referenced repeatedly by being overwritten on each loop repetition. As a result, the purpose of the original program can be attained without program execution that requires complicated processing.

Specifically, in the share processing shown in FIG. 13, a code for dynamically allocating the memory area m is deleted (S161) and a size s and shape for the allocated memory area m detected (S162). Next, a code for allocating a local variable L having the same size and shape as a variable that was allocated to the memory area m is generated within a function having a loop (S163). The codes referencing the memory area m are all changed to codes referencing the local variable L (S164) and the processing is completed.

FIG. 17 shows program changes performed by the share processing. FIG. 17A shows a program prior to the performance of share processing and FIG. 17B shows the program following the performance of share processing.

In the program shown in FIG. 17A, a code (1) dynamically allocates memory within a for loop, and codes (2) and (3) each reference the allocated memory, but since the lifetime of the memory is confined to one loop repetition, the share processing shown in FIG. 13 may be performed.

Specifically, in the share processing illustrated in FIG. 17B, a code (1) that existed in the original program is deleted, and a code (11) for allocating a local variable is instead inserted at a designated position in a function having a for loop. Codes (12) and (13) reference the memory allocated by code (11).

To summarize, in the program conversion apparatus 100, the localizing processing of FIG. 10, the continuous processing of FIG. 11, the continuous localizing processing of FIG. 12, and the share processing of FIG. 13 are performed on memory indicated as being dynamically allocated by the program in the original source program 1, according to the lifetime of the allocated memory. Processing for localizing memory that has been dynamically allocated is performed in all of these processes, except for continuous processing, and the subsequent processing shown in, for example, FIG. 3, S21, and S24. Following continuous processing, processing for freeing dynamically allocated memory immediately following the end of its lifetime is performed. Any memory having a lifetime that is not the object of the above-mentioned four processes is also freed immediately following the end of its lifetime.

This means that the program conversion apparatus 100 changes the source program 1 so that memory indicated as being dynamically allocated is instead allocated statically rather than dynamically. A shortening of the interval between allocation and freeing is also assured, and the burden of dynamic memory management borne by the execution thread when the program is executed is reduced.

In addition, in the continuous processing, dynamic memory is continuously allocated at one time, thereby increasing the efficiency of the recycling processing performed by the execution thread, and making it unnecessary to repeat memory allocation processing numerous times within a loop. This enables program execution to be performed at high speed.

Since the source program for the above program conversion apparatus 100 is assumed to be written in C++, the instruction for freeing dynamically allocated memory needs to be explicitly indicated by the program. However, the invention may be applied to a program conversion apparatus for a language like Java that does not use this kind of instruction. This is achieved by using the invention without the processing relating to free instructions that correspond to code in the source program 1, such as processing performed by the memory free code generating unit 110 (FIG. 2).

Furthermore, the program conversion apparatus 100 only performs compiling from the source program to the executable program, and the executable program is assumed to be executed by another device, but the executable program may also be executed by the program conversion apparatus.

In the program conversion apparatus 100, instructions in the executable program are assumed to be generated for direct interpretation by the CPU, with each instruction relating to a code for freeing memory in the source program 1. However, a library subroutine (function) for calling an OS, a virtual machine or similar, and an instruction for calling such a library subroutine can be generated in the executable program for each instruction relating to a code for freeing memory in the source program 1. Note that platforms which do not include a direct instruction for freeing dynamic memory can indicate freeing of dynamic memory by using a library subroutine. The program conversion apparatus 150 described below performs just such a function.

The following is an explanation of a modification of the program conversion apparatus 100, the program conversion apparatus 150.

Figure 18:
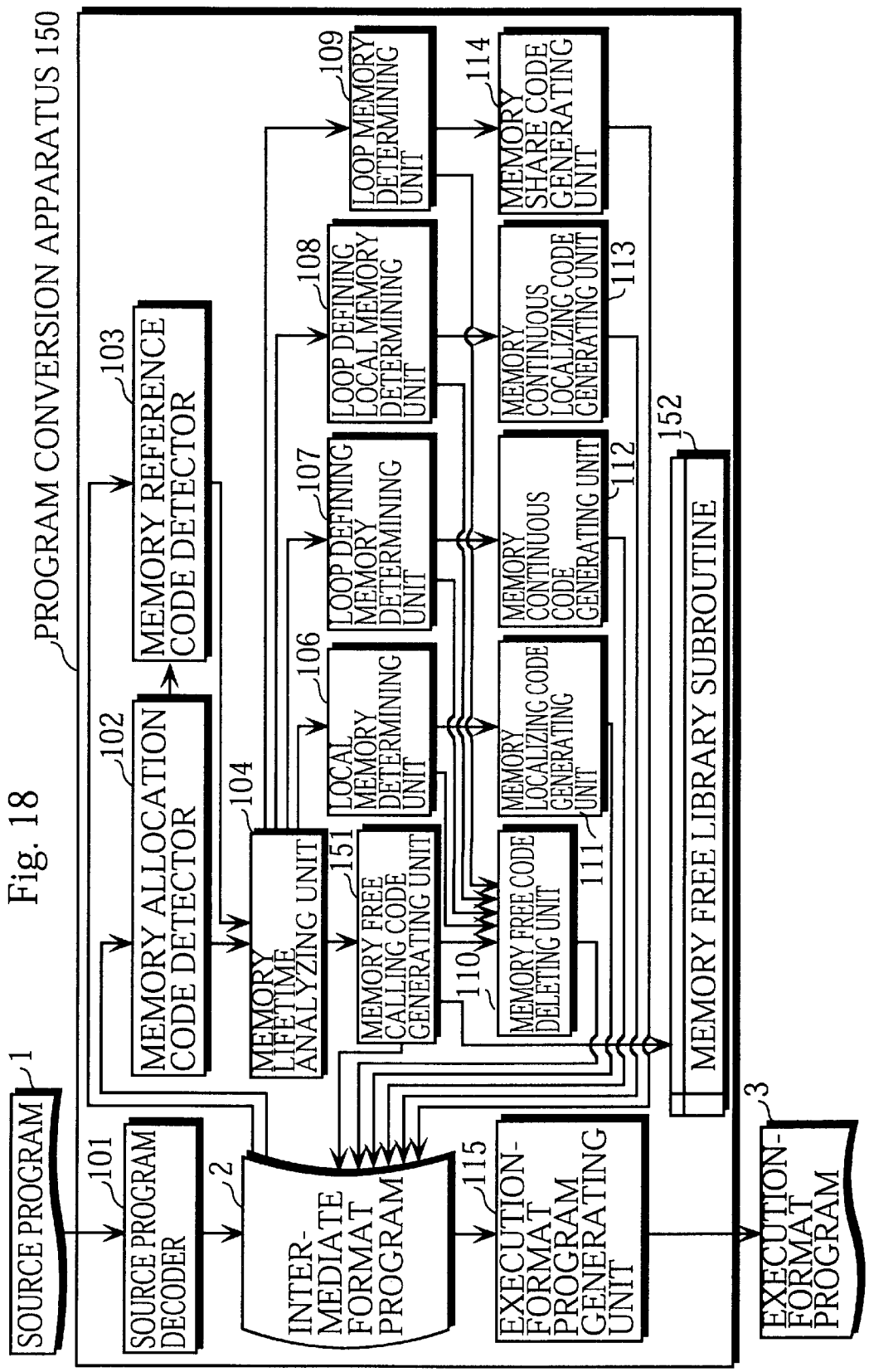
FIG. 18 is a block diagram showing an overall construction for a program conversion apparatus 150.

FIG. 18 is a block diagram showing an overall construction for the program conversion apparatus 150. Those components having the same function as components in the program conversion apparatus 100 are given the same numerical references. Furthermore, the procedure for the processing performed by each of these components conforms to that described in FIG. 3.

The program conversion apparatus 150 has a memory free call code generating unit 151 and a memory free library subroutine 152 instead of the memory free code generating unit 105 of the program conversion apparatus 100.

The memory free call code generating unit 151 receives input data showing memory lifetimes output from the memory free code generating unit 105 and the memory lifetime analyzing unit 104, and inserts a code for calling a library subroutine used to free memory immediately following the end of the memory lifetime. This adds the memory free library subroutine 152, in which this code is written, to the intermediate format program 2.

A program conversion apparatus such as 150 which uses a library subroutine to free dynamic memory functions changes memory indicated as being dynamically allocated by an original program to statically allocated memory in a similar way to the program conversion apparatus 100. This enables the interval between allocation and freeing to be shortened, and reduces the memory management burden placed on the execution thread when program execution is performed.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A program conversion apparatus for converting a source program to an executable program, the source program including a first descriptor indicating dynamic memory allocation, and a second descriptor indicating memory allocation only when instructions are executed within a specified block, the program conversion apparatus comprising:

a specifying means for specifying a lifetime of allocated memory by referring to positions in the source program of (1) the first descriptor and (2) reference descriptors indicating references to memory allocated by the first descriptor;

a determining means for determining whether the specified lifetime is confined within the specified block; and a generating means for generating an instruction in an executable program when the specified lifetime is determined to be confined within the specified block, so that memory indicated as being allocated by the first descriptor in the source program is indicated as being allocated by the second descriptor.

2. A program conversion apparatus for converting a source program to an executable program, the source program including a first descriptor indicating dynamic memory allocation for a specified object, a second descriptor indicating (1) repetition of instructions within a specified block and (2) a number of repetitions, and a third descriptor indicating continuous dynamic memory allocation for a specified plurality of objects, the program conversion apparatus comprising:

a specifying means for specifying a position of the first descriptor in a source program;

a determining means for determining whether the specified position of the first descriptor is within the specified block;

a detecting means for detecting the number of repetitions shown by the second descriptor corresponding to the specified block; and a generating means for generating an instruction in an executable program when the specified position of the first descriptor is determined to be within the specified block, so that memory, determined by repeating the memory allocation indicated by the first descriptor for the number of repetitions shown by the second descriptor, is indicated as being allocated by the third descriptor, the third descriptor being positioned outside the specified block.

3. A program conversion apparatus for converting a source program to an executable program, the source program including a first descriptor indicating dynamic memory allocation for a specified object, a second descriptor indicating (1) repetition of instructions within a specified small block, and (2) a number of repetitions, and a third descriptor indicating continuous memory allocation for a specified plurality of objects only when instructions are executed within a specified large block that includes the specified small block, the program conversion apparatus comprising:

a specifying means for specifying a lifetime of allocated memory, by referring to positions in the source program of (i) the first descriptor and (ii) reference descriptors indicating references to memory allocated by the first descriptor;

a determining means for determining whether the specified lifetime is confined within the specified large block and also whether the position of the first descriptor is within the specified small block;

a detecting means for detecting the number of repetitions shown by the second descriptor corresponding to the specified small block; and a generating means for generating an instruction in the executable program when (a) the specified lifetime is determined to be confined within the specified large block and (b) the position of the first descriptor is determined to be within the specified small block, so that memory, determined by repeating the memory allocation indicated by the first descriptor for the number of repetitions shown by the second descriptor, is indicated as being allocated by the third descriptor, the third descriptor being positioned within the specified large block but outside the specified small block.

4. A program conversion apparatus for converting a source program to an executable program, the source program including a first descriptor indicating dynamic memory allocation, a second descriptor indicating repetition of instructions within a specified small block, and a third descriptor indicating memory allocation only when instructions are executed within a specified large block that includes the specified small block, the program conversion apparatus comprising:

a specifying means for specifying a lifetime of allocated memory, by referring to positions in the source program of (1) the first descriptor and (2) reference descriptors indicating references to memory allocated by the first descriptor;

a determining means for determining whether the specified lifetime lasts for one execution duration of the specified small block; and a generating means for generating an instruction for the executable program when the specified lifetime is determined to last for less than one execution duration of the specified small block, so that memory indicated as being allocated by the first descriptor in the source program is indicated as being allocated by the third descriptor, the third descriptor being positioned within the specified large block but outside the specified small block.

5. A program conversion apparatus for converting a source program to an executable program, the source program including a first descriptor indicating dynamic memory allocation, a second descriptor indicating that allocated memory is to be freed, and a third descriptor indicating memory allocation only when instructions are executed within a specified block, the program conversion apparatus comprising:

a specifying means for specifying a lifetime of allocated memory by referring to positions in the source program of (1) the first descriptor and (2) reference descriptors indicating references to memory allocated by the first descriptor;

a determining means for determining whether the specified lifetime is confined within the specified block; and a generating means for generating an instruction in an executable program when the specified lifetime is determined to be confined within the specified block, so that memory indicated in the source program as being (a) allocated by the first descriptor and (b) freed by the second descriptor is indicated as being allocated by the third descriptor.

6. A program conversion apparatus for converting a source program to an executable program, the source program including a first descriptor indicating dynamic memory allocation for a specified object, a second descriptor indicating that allocated memory is to be freed, a third descriptor indicating (1) repetition of instructions within a specified small block, and (2) a number of repetitions, and a fourth descriptor indicating memory allocation for a specified plurality of objects only when instructions are executed within a specified large block that includes the specified small block, the program conversion apparatus comprising:

a specifying means for specifying a lifetime of allocated memory, by referring to positions in the source program of (A) the first descriptor and (B) reference descriptors indicating references to memory allocated by the first descriptor;

a determining means for determining whether the specified lifetime is confined within the specified large block and whether the position of the first descriptor is within the specified small block;

a detecting means for detecting the number of repetitions for the third descriptor corresponding to the specified small block; and a generating means for generating an instruction in the executable program when (i) the specified lifetime is determined to be confined within the specified large block and (ii) the position of the first descriptor is determined to be within the specified small block, so that memory, determined by repeating the allocation of memory that is (a) allocated by the first descriptor and (b) freed by the second descriptor, for the number of repetitions shown by the third descriptor, is indicated as being allocated by the fourth descriptor, the fourth descriptor being positioned within the specified large block but outside the specified small block.

7. A program conversion apparatus for converting a source program to an executable program, the source program including a first descriptor indicating dynamic memory allocation, a second descriptor indicating that allocated memory is to be freed, a third descriptor indicating repetition of instructions within a specified small block, and a fourth descriptor indicating memory allocation only when instructions are executed within a specified large block that includes the specified small block, the program conversion apparatus comprising:

a specifying means for specifying a lifetime of allocated memory by referring to positions in the source program of (1) the first descriptor and (2) reference descriptors indicating references to memory allocated by the first descriptor;

a determining means for determining whether the specified lifetime lasts for at least one execution duration of the specified small block; and a generating means for generating an instruction for the executable program when the specified lifetime is determined to last for less than one execution duration of the specified small block, so that memory indicated in the source program as being (a) allocated by the first descriptor and (b) freed by the second descriptor, is indicated as being allocated by the fourth descriptor, the fourth descriptor being positioned within the specified large block but outside the specified small block.

8. A program conversion method for converting a source program to an executable program, the source program including a first descriptor indicating dynamic memory allocation, and a second descriptor indicating memory allocation only when instructions are executed within a specified block, the program conversion method comprising:

a specifying step for specifying a lifetime of allocated memory by referring to positions in the source program of (1) the first descriptor and (2) reference descriptors indicating references to memory allocated by the first descriptor;

a determining step for determining whether the specified lifetime is confined within the specified block; and a generating step for generating an instruction in an executable program when the specified lifetime is determined to be confined within the specified block, so that memory indicated as being allocated by the first descriptor in the source program is indicated as being allocated by the second descriptor.

9. A program conversion method for converting a source program to an executable program, the source program including a first descriptor indicating dynamic memory allocation for a specified object, a second descriptor indicating (1) repetition of instructions within a specified block and (2) a number of repetitions, and a third descriptor indicating continuous dynamic memory allocation for a specified plurality of objects, the program conversion method comprising:

a specifying step for specifying a position of the first descriptor in a source program;

a determining step for determining whether the specified position of the first descriptor is within the specified block;

a detecting step for detecting the number of repetitions shown by the second descriptor corresponding to the specified block; and a generating step for generating an instruction in an executable program when the specified position of the first descriptor is determined to be within the specified block, so that memory, determined by repeating the memory allocation indicated by the first descriptor for the number of repetitions shown by the second descriptor, is indicated as being allocated by the third descriptor, the third descriptor being positioned outside the specified block.

10. A program conversion method for converting a source program to an executable program, the source program including a first descriptor indicating dynamic memory allocation for a specified object, a second descriptor indicating (1) repetition of instructions within a specified small block, and (2) a number of repetitions, and a third descriptor indicating continuous memory allocation for a specified plurality of objects only when instructions are executed within a specified large block that includes the specified small block, the program conversion method comprising:

a specifying step for specifying a lifetime of allocated memory, by referring to positions in the source program of (i) the first descriptor and (ii) reference descriptors indicating references to memory allocated by the first descriptor;

a determining step for determining whether the specified lifetime is confined within the specified large block and also whether the position of the first descriptor is within the specified small block;

a detecting step for detecting the number of repetitions shown by the second descriptor corresponding to the specified small block; and a generating step for generating an instruction in the executable program when (a) the specified lifetime is determined to be confined within the specified large block and (b) the position of the first descriptor is determined to be within the specified small block, so that memory, determined by repeating the memory allocation indicated by the first descriptor for the number of repetitions shown by the second descriptor, is indicated as being allocated by the third descriptor, the third descriptor being positioned within the specified large block but outside the specified small block.

11. A program conversion method for converting a source program to an executable program, the source program including a first descriptor indicating dynamic memory allocation, a second descriptor indicating repetition of instructions within a specified small block, and a third descriptor indicating memory allocation only when instructions are executed within a specified large block that includes the specified small block, the program conversion method comprising:

a specifying step for specifying a lifetime of allocated memory, by referring to positions in the source program of (1) the first descriptor and (2) reference descriptors indicating references to memory allocated by the first descriptor;

a determining step for determining whether the specified lifetime lasts for one execution duration of the specified small block; and a generating step for generating an instruction for the executable program when the specified lifetime is determined to last for less than one execution duration of the specified small block, so that memory indicated as being allocated by the first descriptor in the source program is indicated as being allocated by the third descriptor, the third descriptor being positioned within the specified large block but outside the specified small block.

12. A computer-readable recording medium recording a program used by a program conversion apparatus to convert a source program to an executable program, the source program including a first descriptor indicating dynamic memory allocation, and a second descriptor indicating memory allocation only when instructions are executed within a specified block, the recorded program comprising:

a specifying step for specifying a lifetime of allocated memory by referring to positions in the source program of (1) the first descriptor and (2) reference descriptors indicating references to memory allocated by the first descriptor;

a determining step for determining whether the specified lifetime is confined within the specified block; and a generating step for generating an instruction in an executable program when the specified lifetime is determined to be confined within the specified block, so that memory indicated as being allocated by the first descriptor in the source program is indicated as being allocated by the second descriptor.

13. A computer-readable recording medium recording a program used by a program conversion apparatus to convert a source program to an executable program, the source program including a first descriptor indicating dynamic memory allocation for a specified object, a second descriptor indicating (1) repetition of instructions within a specified block and (2) a number of repetitions, and a third descriptor indicating continuous dynamic memory allocation for a specified plurality of objects, the recorded program comprising:

a specifying step for specifying a position of the first descriptor in a source program;

a determining step for determining whether the specified position of the first descriptor is within the specified block;

a detecting step for detecting the number of repetitions shown by the second descriptor corresponding to the specified block; and a generating step for generating an instruction in an executable program when the specified position of the first descriptor is determined to be-within the specified block, so that memory, determined by repeating the memory allocation indicated by the first descriptor for the number of repetitions shown by the second descriptor, is indicated as being allocated by the third descriptor, the third descriptor being positioned outside the specified block.

14. A computer-readable recording medium recording a program used by a program conversion apparatus to convert a source program to an executable program, the source program including a first descriptor indicating dynamic memory allocation for a specified object, a second descriptor indicating (1) repetition of instructions within a specified small block, and (2) a number of repetitions, and a third descriptor indicating continuous memory allocation for a specified plurality of objects only when instructions are executed within a specified large block that includes the specified small block, the recorded program comprising:

a specifying step for specifying a lifetime of allocated memory, by referring to positions in the source program of (i) the first descriptor and (ii) reference descriptors indicating references to memory allocated by the first descriptor;

a determining step for determining whether the specified lifetime is confined within the specified large block and also whether the position of the first descriptor is within the specified small block;

a detecting step for detecting the number of repetitions shown by the second descriptor corresponding to the specified small block; and a generating step for generating an instruction in the executable program when (a) the specified lifetime is determined to be confined within the specified large block and (b) the position of the first descriptor is determined to be within the specified small block, so that memory, determined by repeating the memory allocation indicated by the first descriptor for the number of repetitions shown by the second descriptor, is indicated as being allocated by the third descriptor, the third descriptor being positioned within the specified large block but outside the specified small block.

15. A computer-readable recording medium recording a program used by a program conversion apparatus to convert a source program to an executable program, the source program including a first descriptor indicating dynamic memory allocation, a second descriptor indicating repetition of instructions within a specified small block, and a third descriptor indicating memory allocation only when instructions are executed within a specified large block that includes the specified small block, the recorded program comprising:

a specifying step for specifying a lifetime of allocated memory, by referring to positions in the source program of (1) the first descriptor and (2) reference descriptors indicating references to memory allocated by the first descriptor;

a determining step for determining whether the specified lifetime lasts for one execution duration of the specified small block; and a generating step for generating an instruction for the executable program when the specified lifetime is determined to last for less than one execution duration of the specified small block, so that memory indicated as being allocated by the first descriptor in the source program is indicated as being allocated by the third descriptor, the third descriptor being positioned within the specified large block but outside the specified small block.

* * * * *

UNITED STATES PATENT AND TRADEMARK OFFICE
CERTIFICATE OF CORRECTION

PATENT NO.    : 6,647,547 B1
DATED         : November 11, 2003
INVENTOR(S)   : Kanamaru et al.

It is certified that error appears in the above-identified patent and that said Letters Patent is hereby corrected as shown below:

Column 21,
Line 29, after the word "to" delete "be-within" and insert -- be within --.

Signed and Sealed this

Second Day of November, 2004

JON W. DUDAS
*Director of the United States Patent and Trademark Office*